United States Patent
Nuzum et al.

(10) Patent No.: US 11,514,418 B2
(45) Date of Patent: Nov. 29, 2022

(54) PERSONAL POINT OF SALE (PPOS) DEVICE WITH A LOCAL AND/OR REMOTE PAYMENT KERNEL THAT PROVIDES FOR CARD PRESENT E-COMMERCE TRANSACTION

(71) Applicant: NXP B.V., Eindhoven (NL)

(72) Inventors: Todd Raymond Nuzum, Omaha, NE (US); Melissa Hunter, Austin, TX (US); Derek Alan Snell, Indianapolis, IN (US); Patrick Ryan Comiskey, Lake Saint Louis, MO (US); Suresh Palliparambil, San Ramon, CA (US); Michael Dow, Austin, TX (US)

(73) Assignee: NXP B.V., Eindhoven (NL)

( * ) Notice: Subject to any disclaimer, the term of this patent is extended or adjusted under 35 U.S.C. 154(b) by 937 days.

(21) Appl. No.: 15/462,904

(22) Filed: Mar. 19, 2017

(65) Prior Publication Data
US 2018/0268390 A1  Sep. 20, 2018

(51) Int. Cl.
*G06Q 20/18* (2012.01)
*G06Q 20/34* (2012.01)
(Continued)

(52) U.S. Cl.
CPC .......... *G06Q 20/18* (2013.01); *G06Q 20/204* (2013.01); *G06Q 20/34* (2013.01); *G06Q 20/40* (2013.01)

(58) Field of Classification Search
None
See application file for complete search history.

(56) References Cited

U.S. PATENT DOCUMENTS

| 5,721,781 A | 2/1998 | Deo et al. |
| 5,910,987 A | 6/1999 | Ginter et al. |

(Continued)

FOREIGN PATENT DOCUMENTS

| CN | 101976377 A | 2/2011 |
| CN | 202003442 U | 10/2011 |

(Continued)

OTHER PUBLICATIONS

"Secure cryptoprocessor". As last edited by "jpbowen". Retrieved from https://en.wikipedia.org/w/index.php?title=Secure_cryptoprocessor&oldid=721306220 Revision date: May 20, 2016.

(Continued)

*Primary Examiner* — Fateh M Obaid

(57) ABSTRACT

Within EMV payment specification, use of an unattended terminal to accept a payment is allowed. Creating a device that has both EMV level 1 (L1) and level 2 (L2) payment components combined with a virtual merchant creates a "card present" transaction for an on-line or e-commerce merchant. This device can be called a personal Point of Sale (pPOS). This specification discloses pPOS devices and methods that can provide for card present e-commerce transactions with a payment kernel that is local and/or remote to a pPOS device. In some embodiments, a pPOS device can include only a secure microcontroller function (MCF) and a secure element, wherein a payment kernel configured to process payment is local, remote, or split between local and remote to the device. In some embodiments, a pPOS device can further include a reader, a sensor switch, and/or a user interface function.

25 Claims, 26 Drawing Sheets

(51) Int. Cl.
*G06Q 20/20* (2012.01)
*G06Q 20/40* (2012.01)

(56) References Cited

U.S. PATENT DOCUMENTS

| | | | |
|---|---|---|---|
| 6,112,987 A | 9/2000 | Lambert et al. | |
| 6,587,838 B1 | 7/2003 | Esposito et al. | |
| 6,615,194 B1 | 9/2003 | Deutsch et al. | |
| 6,889,198 B2 | 5/2005 | Kawan | |
| 6,978,933 B2 | 12/2005 | Yap et al. | |
| 6,983,882 B2 | 1/2006 | Cassone | |
| 7,500,616 B2 | 3/2009 | Beenau et al. | |
| 8,229,358 B2 | 7/2012 | Caudevilla Laliena et al. | |
| 8,240,561 B2 | 8/2012 | Busch-Sorensen | |
| 8,706,032 B2 | 4/2014 | Zhang et al. | |
| 8,807,440 B1 | 8/2014 | von Behren et al. | |
| 8,965,398 B2 | 2/2015 | Zhu et al. | |
| 8,985,442 B1* | 3/2015 | Zhou | G06Q 20/30 235/375 |
| 9,026,459 B2* | 5/2015 | Fisher | H04W 4/21 705/16 |
| 9,027,102 B2 | 5/2015 | Katzer et al. | |
| 9,092,766 B1 | 7/2015 | Bedier et al. | |
| 9,294,268 B2 | 3/2016 | Von Mueller et al. | |
| 9,312,923 B2 | 4/2016 | Lyne et al. | |
| 9,317,845 B1* | 4/2016 | Ekselius | G06Q 20/204 |
| 9,332,432 B2 | 5/2016 | Low et al. | |
| 9,704,355 B2 | 7/2017 | Beatty et al. | |
| 9,852,410 B1 | 12/2017 | Chen et al. | |
| 9,906,454 B2* | 2/2018 | Prakash | H04L 47/18 |
| 2002/0163421 A1 | 11/2002 | Wang et al. | |
| 2004/0078589 A1* | 4/2004 | Giraud | G06F 21/77 726/34 |
| 2004/0236693 A1* | 11/2004 | Quesselaire | G07F 7/0866 705/50 |
| 2006/0069926 A1 | 3/2006 | Ginter et al. | |
| 2008/0086417 A1* | 4/2008 | Bykov | G06Q 20/20 705/40 |
| 2009/0164327 A1 | 6/2009 | Bishop et al. | |
| 2009/0187492 A1 | 7/2009 | Hammad et al. | |
| 2009/0307142 A1* | 12/2009 | Mardikar | G06Q 20/1085 705/72 |
| 2010/0011270 A1* | 1/2010 | Yamamoto | H04W 8/04 714/E11.131 |
| 2010/0280956 A1 | 11/2010 | Chutorash et al. | |
| 2012/0022914 A1 | 1/2012 | Edward et al. | |
| 2012/0072350 A1 | 3/2012 | Goldthwaite et al. | |
| 2012/0084210 A1 | 4/2012 | Farahmand | |
| 2012/0109829 A1 | 5/2012 | McNeal et al. | |
| 2012/0246079 A1 | 9/2012 | Wilson et al. | |
| 2013/0086375 A1 | 4/2013 | Lyne et al. | |
| 2013/0179351 A1 | 7/2013 | Wallner | |
| 2013/0282502 A1 | 10/2013 | Jooste | |
| 2013/0344807 A1 | 12/2013 | Huomo et al. | |
| 2014/0040149 A1* | 2/2014 | Fiske | G06Q 20/322 705/71 |
| 2014/0058937 A1* | 2/2014 | Watson | G06Q 20/3227 705/41 |
| 2014/0095385 A1 | 4/2014 | Ainslie et al. | |
| 2014/0114853 A1* | 4/2014 | Guedj | G06Q 20/12 705/44 |
| 2014/0136354 A1 | 5/2014 | Emery et al. | |
| 2014/0195429 A1 | 7/2014 | Paulsen | |
| 2014/0279565 A1 | 9/2014 | Trump et al. | |
| 2014/0310113 A1* | 10/2014 | Sengupta | G06Q 20/20 705/17 |
| 2014/0324698 A1* | 10/2014 | Dolcino | G06Q 20/3227 705/44 |
| 2015/0046216 A1 | 2/2015 | Adjaoute | |
| 2015/0058224 A1 | 2/2015 | Gaddam et al. | |
| 2015/0081461 A1 | 3/2015 | Adrangi et al. | |
| 2015/0287031 A1* | 10/2015 | Radu | G06K 7/10009 705/18 |
| 2015/0339659 A1* | 11/2015 | Ballesteros | G06Q 20/3229 705/76 |
| 2015/0348001 A1 | 12/2015 | Van Os et al. | |
| 2016/0057619 A1 | 2/2016 | Lopez | |
| 2016/0063480 A1* | 3/2016 | Ballesteros | G06Q 20/3227 705/17 |
| 2016/0092876 A1 | 3/2016 | Kamal et al. | |
| 2016/0125376 A1* | 5/2016 | Beatty | G06Q 20/204 705/72 |
| 2016/0364717 A1 | 12/2016 | Lyne | |
| 2016/0364723 A1* | 12/2016 | Reese | G06Q 20/4012 |
| 2017/0061441 A1 | 3/2017 | Kamal et al. | |
| 2017/0076269 A1* | 3/2017 | Saeed | G06Q 20/3224 |
| 2017/0103382 A1* | 4/2017 | Kim | G06Q 20/3278 |
| 2017/0109399 A1 | 4/2017 | Stearn et al. | |
| 2017/0109509 A1 | 4/2017 | Baghdasaryan | |
| 2017/0109620 A1* | 4/2017 | Wurmfeld | G06Q 20/341 |
| 2017/0178100 A1 | 6/2017 | Bergeon et al. | |
| 2017/0200144 A1 | 7/2017 | Chatterton | |
| 2017/0221056 A1 | 8/2017 | Karpenko et al. | |
| 2017/0278096 A1 | 9/2017 | Chitalia et al. | |
| 2017/0317987 A1 | 11/2017 | Vijayasankar et al. | |
| 2017/0357970 A1 | 12/2017 | Muftic | |
| 2017/0357973 A1 | 12/2017 | Van Os et al. | |
| 2018/0033013 A1 | 2/2018 | Park et al. | |
| 2018/0089691 A1 | 3/2018 | Sibert et al. | |
| 2018/0101837 A1 | 4/2018 | Pandey et al. | |
| 2018/0130040 A1* | 5/2018 | Nuzum | G06Q 20/204 |
| 2018/0144334 A1 | 5/2018 | Fontaine et al. | |
| 2018/0165759 A1 | 6/2018 | Carrington et al. | |
| 2018/0189769 A1 | 7/2018 | Narasimhan et al. | |
| 2018/0268408 A1 | 9/2018 | Bortos et al. | |
| 2018/0365679 A1 | 12/2018 | Nuzum et al. | |
| 2019/0114606 A1 | 4/2019 | Nuzum et al. | |

FOREIGN PATENT DOCUMENTS

| | | |
|---|---|---|
| GB | 2524946 A | 10/2015 |
| GB | 2529872 A | 3/2016 |
| WO | 00/26838 | 5/2000 |
| WO | 2008/103880 A2 | 8/2008 |
| WO | 2010/033967 A1 | 3/2010 |
| WO | 2010/128442 A2 | 11/2010 |
| WO | 2013/126996 A1 | 9/2013 |
| WO | 2015/080689 A1 | 6/2015 |
| WO | 2016/122457 A1 | 8/2016 |
| WO | 2016/175388 A2 | 11/2016 |

OTHER PUBLICATIONS

U.S. Appl. No. 15/783,876, filed Oct. 13, 2017.
Office Action for related U.S. Appl. No. 15/344,508 (dated May 31, 2018).
U.S. Appl. No. 15/995,033, filed May 31, 2018.
Final Office Action for U.S. Appl. No. 15/344,508 (dated Mar. 25, 2019).
Non-Final Office Action for U.S. Appl. No. 15/344,508 dated Aug. 14, 2019; 17 Pages.
Final Office Action for U.S. Appl. No. 15/344,508; dated Dec. 20, 2019; 7 Pages.
Non-Final Office Action for U.S. Appl. No. 15/783,876; dated Jan. 21, 2020; 57 pages.
Notice of Allowance for U.S. Appl. No. 15/344,508; dated Apr. 3, 2020; 12 Pages.
Non-Final Office Action for U.S. Appl. No. 15/995,033; dated Mar. 3, 2020; 62 Pages.
Non-Final Office Action for U.S. Appl. No. 15/627,406; dated Nov. 13, 2020; 24 pages.
Final Office Action for U.S. Appl. No. 15/995,033; dated Aug. 27, 2020; 51 pages.
Final Office Action for U.S. Appl. No. 15/627,406; dated Jul. 2, 2020; 34 Pages.
Final Office Action for U.S. Appl. No. 15/783,876; dated Jul. 17, 2020; 57 pages.
Non-Final Office Action for U.S. Appl. No. 15/995,033; dated Jun. 9, 2021; 43 pages.
Final Office Action dated Nov. 8, 2021 for U.S. Appl. No. 15/995,033, 37 Pages.

(56) References Cited

OTHER PUBLICATIONS

Final Office Action for U.S. Appl. No. 15/783,876 dated Sep. 14, 2021; 41 Pages.
Non-Final Office Action for U.S. Appl. No. 15/783,876; dated Jul. 1, 2022; 29 pages.
Non-Final Office Action for U.S. Appl. No. 15/627,406; (dated Feb. 24, 2020) 17 pages.
Final Office Action; U.S. Appl. No. 16/627,406; (dated Mar. 18, 2021) 22 pages.
Non-Final Office Action for U.S. Appl. No. 15/995,033; dated May 27, 2022. 6 pages.
Non-Final Office Action for U.S. Appl. No. 15/783,876; dated Mar. 11, 2021; 43 pages.

* cited by examiner

PERSONAL POINT OF SALE (PPOS) DEVICE WITH A LOCAL AND/OR REMOTE PAYMENT KERNEL THAT PROVIDES FOR CARD PRESENT E-COMMERCE TRANSACTION

CROSS REFERENCE TO RELATED APPLICATIONS

This application is related to U.S. patent application Ser. No. 15/344,508, entitled "PERSONAL POINT OF SALE (PPOS) DEVICE THAT PROVIDES FOR CARD PRESENT E-COMMERCE TRANSACTION" filed on Nov. 4, 2016, which is being incorporated herein by reference in its entirety.

FIELD

The described embodiments relate generally to devices and methods that provide for e-commerce transactions, and more particularly to personal Point of Sale (pPOS) devices and methods that provide for card present e-commerce transactions with a local and/or remote payment kernel.

BACKGROUND

Today e-commerce transactions are processed as "card not present". This means the customer has to enter their card account number, printed security features on the card like CVC/CVC2 (card verification code/card validation code). This data is used and stored by the merchant to make the payment. This is customer PCI (Payment Card Industry) data. The merchant also pays a higher interchange rate because of the type of fraud which is possible because the data is exposed in the transaction and at the merchant web site.

Alternatively, "card present" e-commerce transactions can overcome problems or disadvantages associated with "card not present" e-commerce transactions. Additionally, it can be advantageous to have a payment kernel that is local and/or remote to a personal device. Therefore, it is desirable to have devices and methods that can provide for "card present" e-commerce transactions with a local and/or remote payment kernel.

SUMMARY

Within the EMV payment specification, the use of an unattended terminal to accept a payment is allowed. Creating a device that has both the EMV level 1 (L1) and level 2 (L2) payment components combined with a virtual merchant creates a "card present" transaction for an on-line or e-commerce merchant. This device can be called a personal Point of Sale (pPOS). (Note: EMV stands for Europay, MasterCard, and Visa.)

This specification discloses personal Point of Sale (pPOS) devices and methods that can provide for card present e-commerce transactions with a payment kernel that is local and/or remote to a personal Point of Sale (pPOS) device. In some embodiments, personal Point of Sale (pPOS) is a device that can provide a Point of Sale (POS) for card present e-commerce transactions. In some embodiments, the pPOS device is owned by the customer or provided by the merchant allowing the customer to create, store and validate the user (which is the customer) via customer validation methods (CVM) and data elements on the device. In some embodiments, the CVM data elements can be a simple tap sequence, biometrics, PKI (public key infrastructure), authentication application, or any other smart card application or service. In some embodiments, the pPOS device can also allow the merchant to configure the transaction flow to meet their authentication requirements for a specific transaction based on dollar amount, customer, or product type or services. The merchant can determine if a higher or lower authentication requirements is needed and enforces these requirements in data elements and parameter changes via the EMV (EMV stands for Europay, MasterCard, and Visa) payment process flow. In some embodiments, the device also supports Point to Point encryption (P2PE) and End to End encryption (E2EE). These encryption capabilities protect the customer's PCI data at rest and in transit. In some embodiments, the device can support both contact and/or contactless EMV transactions from payment cards, mobile phones and wearables. This removes the need for a customer to enter their credit or debit account number on merchant's e-commerce web site.

The present invention discloses a device for providing a personal point of sale (pPOS) for card present e-commerce transactions, the device comprising: a secure microcontroller function (MCF) and a secure element, wherein a payment kernel configured to process payment is remote to the device. The secure element is configured to store and process payment and identification application.

In some embodiments, the device further comprises one or more of the following: a reader, a sensor switch, and a user interface function. The reader is configured to read a payment and/or identity instrument. The sensor switch is configured to initiate and/or terminate a transaction.

In some embodiments, a user of the device is allowed to grant access to configuration and processing of the payment kernel by a merchant, a merchant acquirer, a payment issuer, and/or an identification issuer.

In some embodiments, the secure MCF and/or a second MCF is configured to perform I/O (input/output) functions.

In some embodiments, the secure MCF and/or the second MCF is configured to perform I/O (input/output) functions with a certified EMV level 3 (L3) payment application, wherein EMV stands for Europay, MasterCard, and Visa. The secure MCF and/or the second MCF is further configured to perform I/O (input/output) functions with one or more of the following: a reader, a sensor switch, a user interface function. The reader is configured to read a payment and/or identity instrument. The sensor switch is configured to initiate and/or terminate a transaction.

In some embodiments, the secure MCF and/or the second MCF is configured to perform I/O (input/output) functions with the certified EMV level 3 (L3) payment application using one or more of the following: USB (Universal Serial Bus), audio jack, Bluetooth, WiFi (wireless local area network), NFC (near field communication), near field magnetic induction (NFMI) communication, a remote MCF, any computer network.

The present invention discloses a device for providing a personal point of sale (pPOS) for card present e-commerce transactions, the device comprising: a secure microcontroller function (MCF) and a secure element, wherein a payment kernel configured to process payment is local, remote, or split between local and remote to the device. The secure element is configured to store and process payment and identification application.

In some embodiments, the payment kernel is configured to support both local and/or remote execution of payment processing based on merchant and merchant acquirer rules.

In some embodiments, the device further comprises one or more of the following: a reader, a sensor switch, and a user interface function. The reader is configured to read a payment and/or identity instrument. The sensor switch is configured to initiate and/or terminate a transaction.

In some embodiments, the secure MCF and/or a second MCF is configured to perform I/O (input/output) functions.

In some embodiments, the secure MCF and/or the second MCF is configured to perform I/O (input/output) functions with a certified EMV level 3 (L3) payment application, wherein EMV stands for Europay, MasterCard, and Visa. The secure MCF and/or the second MCF is further configured to perform I/O (input/output) functions with one or more of the following: a reader, a sensor switch, and a user interface function. The reader is configured to read a payment and/or identity instrument. The sensor switch is configured to initiate and/or terminate a transaction.

In some embodiments, the secure MCF and/or the second MCF is configured to perform I/O (input/output) functions with a certified EMV level 3 (L3) payment application via a remote microcontroller function (MCF), wherein EMV stands for Europay, MasterCard, and Visa.

In some embodiments, the payment kernel is interfaced to the device via the remote MCF.

In some embodiments, a user allows the payment kernel to be configured by a merchant and/or merchant acquirer for a merchant payment and/or a user authentication transaction.

In some embodiments, the secure element is configured to execute: a secure element application either local to and/or remote to the device, wherein the secure element application is used for payment and/or authentication.

In some embodiments, the sensor switch is further configured to collect user authentication data and notify a user of a device status.

In some embodiments, the secure MCF and/or the second MCF is configured to perform I/O (input/output) functions with a certified EMV level 3 (L3) payment application, wherein EMV stands for Europay, MasterCard, and Visa.

In some embodiments, the I/O (input/output) functions provide transaction level routing between the payment kernel that is local to the device and the payment kernel that is remote to the device.

In some embodiments, a routing logic is determined based on one or more of the following: payment and/or identification instrument, payment and/or identification application, payment and/or identification application data elements, payment and/or identification transaction history, merchant type, merchant payment processing rules, merchant device identification rules, merchant device user authentication rules, merchant acquirer data element and processing results.

In some embodiments, a customer initiates a transaction by presenting a payment and/or identity instrument to the device.

In some embodiments, the identity instrument enables authentication of a user and is comprised of one or more of the following: a face of the user, a finger of the user, a fingerprint of the user, an iris of the user, a voice of the user, a heart rhythm of the user, a physical attribute of the user.

In some embodiments, a merchant and/or customer initiates a transaction from an external system that requires a payment and/or authentication from a user.

The present invention also discloses a method for providing a personal point of sale (pPOS) for card present e-commerce transactions, the method comprising: (a) initiating, by a user and/or a merchant, a request for a payment transaction; (b) presenting, by the user, an instrument to a pPOS device, wherein no instrument data is entered into a website, a web page, or a mobile application; (c) authenticating and validating, by the pPOS device, the instrument for the merchant and/or an issuer of the instrument; (d) processing, by the pPOS device, the payment transaction, wherein the authenticating and validating step and the processing step are executed in one of the following manner: executed locally on the pPOS device, executed remotely from the pPOS device, or executed split between locally on and remotely from the pPOS device.

In some embodiments, the authenticating and validating step and the processing step are executed locally on and/or remotely from the pPOS device based on merchant and merchant acquirer rules.

In some embodiments, an execution time is managed for optimal performance based on local and remote processing resources.

In some embodiments, a processing logic for execution locally on and/or remotely from the pPOS device is determined based on one or more of the following: merchant type, items or services being purchased, payment application, payment presentment type, processing time, merchant preference, merchant acquirer processing rules.

In some embodiments, a shared processing between executing locally on and/or remotely from the pPOS device is optimized for performance of the payment transaction based on one or more of the following: merchant type, items or services being purchased, payment and/or identification instrument, payment and/or identification application, payment presentment type, processing time, merchant preference, merchant acquirer processing rules, remote resources, local resources, interface protocol and capabilities.

The above summary is not intended to represent every example embodiment within the scope of the current or future Claim sets. Additional example embodiments are discussed within the Figures and Detailed Description below.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Representative devices and methods according to the present application are described in this section. These examples are being provided solely to add context and aid in the understanding of the described embodiments. It will thus be apparent to one skilled in the art that the described embodiments may be practiced without some or all of these specific details. In other instances, well known process steps or device details have not been described in detail in order to avoid unnecessarily obscuring the described embodiments. Other embodiments are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1A:
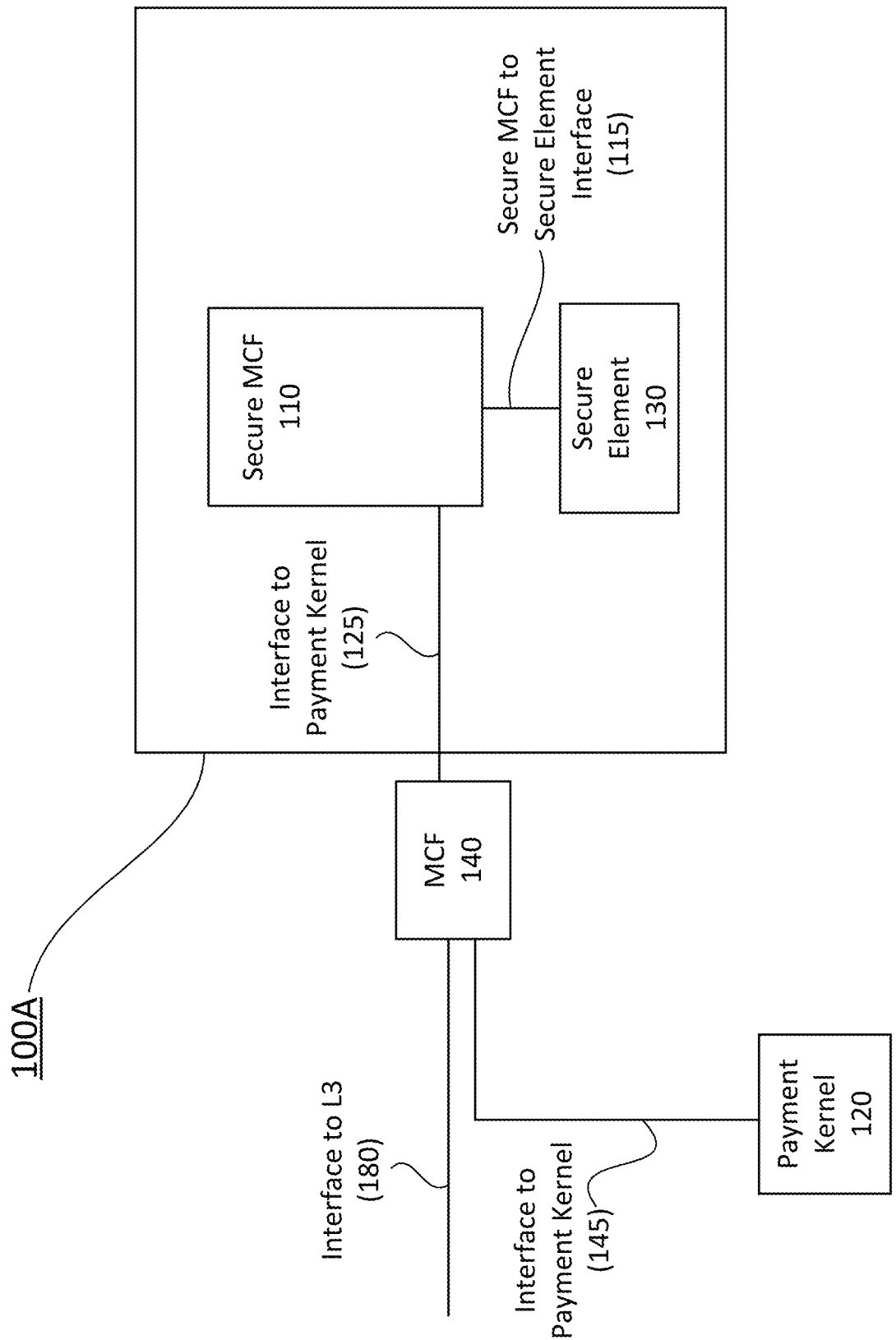
FIG. 1A shows a first personal Point of Sale (pPOS) device that is configured to provide for card present e-commerce transactions with a payment kernel remote to the device, in accordance with some example embodiments.

FIG. 1A shows a first personal Point of Sale (pPOS) device 100A that is configured to provide for card present e-commerce transactions with a payment kernel 120 remote to the device, in accordance with some example embodiments. FIG. 1A shows that the pPOS device 100A includes a secure microcontroller function (MCF) 110, a secure element 130, a secure MCF to secure element interface (115), and an interface to payment kernel (125). FIG. 1A also shows that a payment kernel 120 used for payment processing is remote to the pPOS device 100A, and not included in the pPOS device 100A. FIG. 1A shows that an external MCF 140 can be used for interfacing the pPOS device 100A to the payment kernel 120 and a certified EMV (EMV stands for Europay, MasterCard, and Visa) level 3 (L3) payment application, via an interface to payment kernel (145) and an interface to L3 (180) respectively. But, in some other embodiments (not shown in FIG. 1A), the interfacing can occur without the MCF 140, so that the interfacing is direct from the pPOS device 100A to the payment kernel 120 and EMV level 3 (L3) payment application. The pPOS device 100A can also include other components and interfaces, but these are not shown in detail in order to avoid unnecessarily obscuring the described embodiments.

In FIG. 1A, the secure MCF 110 can be configured to provide application and data level encryption and hardware/software tamper detection. The payment kernel 120 is remote (i.e., external) to the pPOS device 100A, and can be configured to process payment. In some embodiments, a user can allow the payment kernel 120 to be configured by a merchant and/or merchant acquirer for a merchant payment or a user authentication transaction. In some embodiments, the payment kernel 120 can be EMV level 2 certified for contact and/or contact less transaction, where EMV stands for Europay, MasterCard, and Visa.

In FIG. 1A, the secure element 130 can be configured to store and process payment and identification application. In some embodiments, the secure element 130 can be configured to execute a secure element application that is used for payment and authentication. In some embodiments, the secure element application can perform authentication using a multi-factor authentication method. In some embodiments, the secure element application can perform authentication using a multi-factor authentication method via PKI (public key infrastructure) and FIDO (Fast IDentity Online). In some embodiments, the secure element 130 can be further configured to execute a second secure element application that is used for customer biometric storage and validation.

In FIG. 1A, the pPOS device 100A only includes a secure MCF 110. In some embodiments, the secure MCF 110 can be configured to perform I/O (input/output) functions. In some embodiments, the secure MCF 100 can be configured to perform I/O (input/output) functions with a certified EMV level 3 (L3) payment application, where EMV stands for Europay, MasterCard, and Visa. In FIG. 1A, these I/O functions with the EMV level 3 payment application can be performed via the interface 180 (and interface to payment kernel 125). In some embodiments, the secure MCF 110 can be configured to perform I/O (input/output) functions with the certified EMV level 3 payment application using one or more of the following: USB (Universal Serial Bus), audio jack, Bluetooth, WiFi (wireless local area network), NFC (near field communication), near field magnetic induction (NFMI) communication, a remote MCF, and any computer network. Therefore, for example, the pPOS device 100A can perform I/O functions with the EMV level 3 payment application directly using any computer network (such as PAN (personal area network), LAN (local area network), WAN (wide area network), MAN (metropolitan area network), etc.) in a peer to peer configuration. Or, in another example, the pPOS device 100A can perform I/O functions with the EMV level 3 payment application indirectly using a remote MCF (in a peer to peer configuration or a tethering configuration). In such a case, the remote MCF can be a laptop computer, a desktop computer, a tablet computer, a smart phone, or any device that can access the internet. Further, the pPOS device 100A can be configured to interface with the remote MCF in a tethering configuration using the audio jack or one of these interface protocols: USB, Bluetooth, WiFi, NFC, NFMI.

Figure 1B:
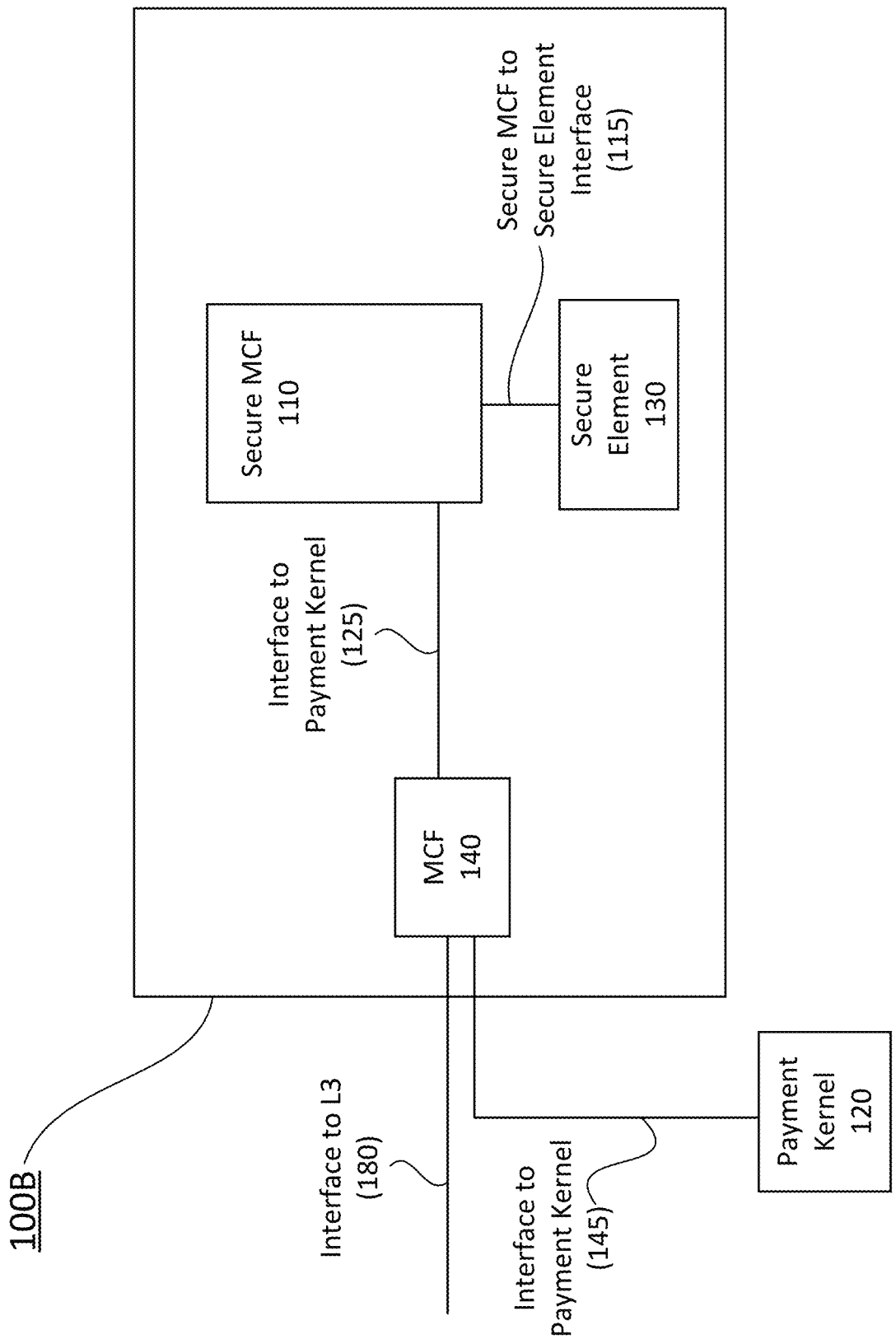
FIG. 1B shows a second personal Point of Sale (pPOS) device that is configured to provide for card present e-commerce transactions with a payment kernel remote to the device, in accordance with some example embodiments.

FIG. 1B shows a second personal Point of Sale (pPOS) device 100B that is configured to provide for card present e-commerce transactions with a payment kernel 120 remote to the device, in accordance with some example embodiments. The pPOS device 100B is very similar to the pPOS device 100A shown in FIG. 1A, except that the pPOS device 100B also includes a second MCF 140. In particular, FIG. 1B shows that the pPOS device 100B includes a secure microcontroller function (MCF) 110, a secure element 130, a MCF 140, a secure MCF to secure element interface (115), and an interface to payment kernel (125). FIG. 1B also shows that a payment kernel 120 used for payment processing is remote to the pPOS device 100A, and not included in the pPOS device 100A. FIG. 1B shows that the internal MCF 140 can be used for interfacing the pPOS device 100B to the payment kernel 120 and a certified EMV level 3 (L3) payment application, via an interface to payment kernel (145) and an interface to L3 (180) respectively. The pPOS device 100B can also include other components and interfaces, but these are not shown in detail in order to avoid unnecessarily obscuring the described embodiments.

In FIG. 1B, for some embodiments, the secure MCF 110 and/or a second MCF 140 can be configured to perform I/O (input/output) functions. In some embodiments, the secure MCF 100 and/or the second MCF 140 can be configured to perform I/O (input/output) functions with a certified EMV level 3 (L3) payment application, where EMV stands for Europay, MasterCard, and Visa. In FIG. 1B, these I/O functions with the EMV level 3 payment application can be performed via the interface 180. In some embodiments, the secure MCF 110 and/or the second MCF 140 can be configured to perform I/O (input/output) functions with the certified EMV level 3 payment application using one or more of the following: USB (Universal Serial Bus), audio jack, Bluetooth, WiFi (wireless local area network), NFC (near field communication), near field magnetic induction (NFMI) communication, a remote MCF, and any computer network. Therefore, for example, the pPOS device 100B can perform I/O functions with the EMV level 3 payment application directly using any computer network (such as PAN (personal area network), LAN (local area network), WAN (wide area network), MAN (metropolitan area network), etc.) in a peer to peer configuration. Or, in another example, the pPOS device 100B can perform I/O functions with the EMV level 3 payment application indirectly using a remote MCF (in a peer to peer configuration or a tethering configuration). In such a case, the remote MCF can be a laptop computer, a desktop computer, a tablet computer, a smart phone, or any device that can access the internet. Further, the pPOS device 100B can be configured to interface with the remote MCF in a tethering configuration using the audio jack or one of these interface protocols: USB, Bluetooth, WiFi, NFC, NFMI.

Figure 1C:
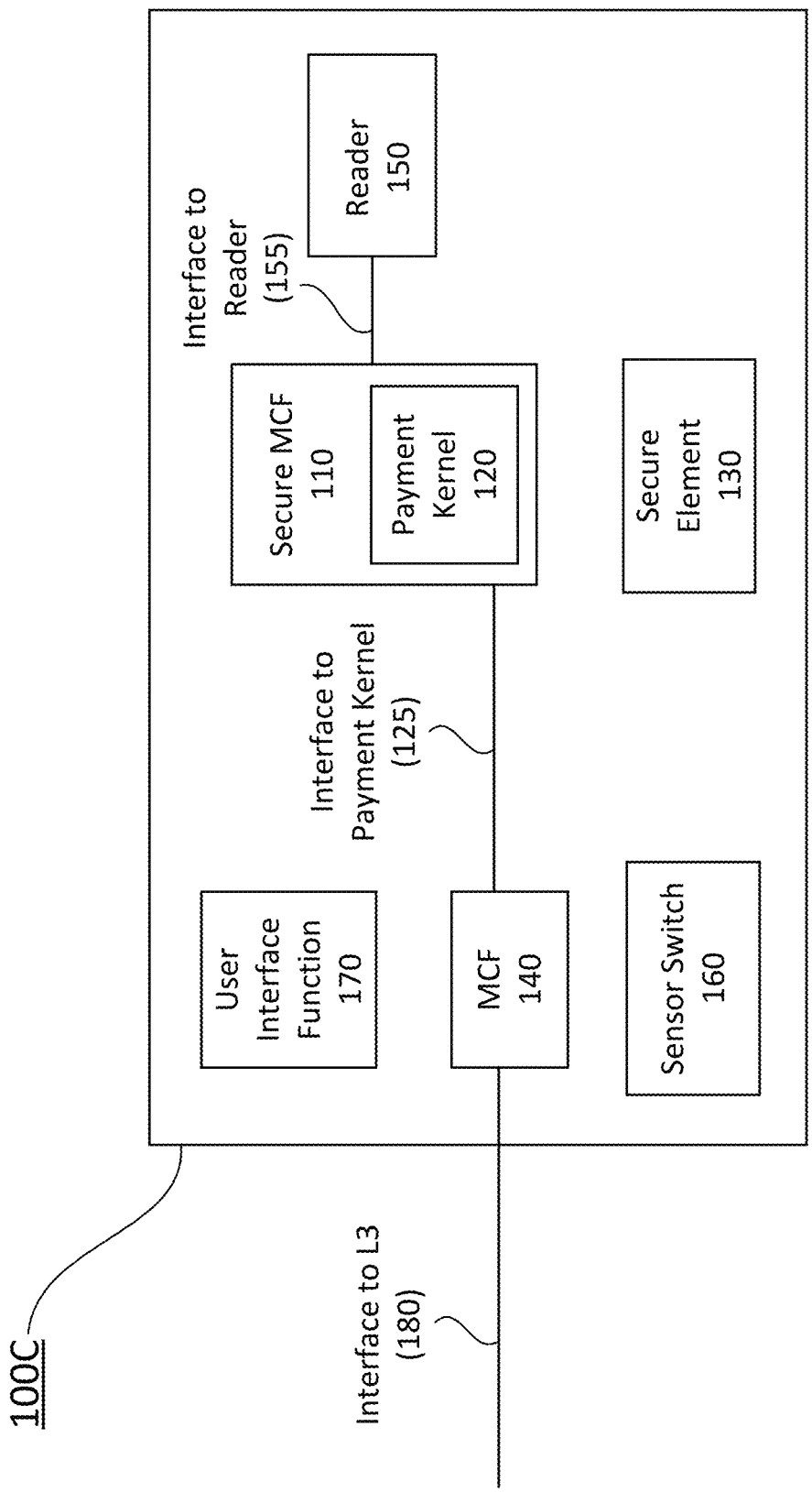
FIG. 1C shows a third personal Point of Sale (pPOS) device that is configured to provide for card present e-commerce transactions with a payment kernel local to the device, in accordance with some example embodiments.

FIG. 1C shows a third personal Point of Sale (pPOS) device 100C that is configured to provide for card present e-commerce transactions with a payment kernel local to the device, in accordance with some example embodiments. FIG. 1C shows that the pPOS device 100C includes a secure microcontroller function (MCF) 110, a payment kernel 120 (which is contained in the secure MCF 110), a secure element 130, a second MCF 140, a reader 150, a sensor switch 160, and a user interface function 170. FIG. 1C also shows that the pPOS device 100C includes an interface 180 to a certified EMV level 3 (L3) payment application, an interface 125 between the secure MCF 110 and the second MCF 140, and an interface 155 between the secure MCF 110 and the reader 150. The pPOS device 100C can also include other interfaces, but these are not shown in detail in order to avoid unnecessarily obscuring the described embodiments.

In FIG. 1C, the secure MCF 110 can be configured to provide application and data level encryption and hardware/software tamper detection. The payment kernel 120 is contained in the secure MCF 110, and can be configured to process payment. In some embodiments, a user can allow the payment kernel 120 to be configured by a merchant and/or merchant acquirer for a merchant payment or a user authentication transaction. In some embodiments, the payment kernel 120 can be EMV level 2 certified for contact and/or contact less transaction, where EMV stands for Europay, MasterCard, and Visa.

In FIG. 1C, the secure element 130 can be configured to store and process payment and identification application. In some embodiments, the secure element 130 can be configured to execute a secure element application that is used for payment and authentication. In some embodiments, the secure element application can perform authentication using a multi-factor authentication method. In some embodiments, the secure element application can perform authentication using a multi-factor authentication method via PKI (public key infrastructure) and FIDO (Fast IDentity Online). In some embodiments, the secure element 130 can be further configured to execute a second secure element application that is used for customer biometric storage and validation.

In FIG. 1C, the pPOS device 100C also includes a second MCF 140. In some embodiments, the secure MCF 110 and/or a second MCF 140 can be configured to perform I/O (input/output) functions. In some embodiments, the secure MCF 100 and/or the second MCF 140 can be configured to perform I/O (input/output) functions with a certified EMV level 3 (L3) payment application, where EMV stands for Europay, MasterCard, and Visa. In FIG. 1C, these I/O functions with the EMV level 3 payment application can be performed via the interface 180. In some embodiments, the secure MCF 110 and/or the second MCF 140 can be configured to perform I/O (input/output) functions with the certified EMV level 3 payment application using one or more of the following: USB (Universal Serial Bus), audio jack, Bluetooth, WiFi (wireless local area network), NFC (near field communication), near field magnetic induction (NFMI) communication, a remote MCF, and any computer network. Therefore, for example, the pPOS device 100C can perform I/O functions with the EMV level 3 payment application directly using any computer network (such as PAN (personal area network), LAN (local area network), WAN (wide area network), MAN (metropolitan area network), etc.) in a peer to peer configuration. Or, in another example, the pPOS device 100C can perform I/O functions with the EMV level 3 payment application indirectly using a remote MCF (in a peer to peer configuration or a tethering configuration). In such a case, the remote MCF can be a laptop computer, a desktop computer, a tablet computer, a smart phone, or any device that can access the internet. Further, the pPOS device 100C can be configured to interface with the remote MCF in a tethering configuration using the audio jack or one of these interface protocols: USB, Bluetooth, WiFi, NFC, NFMI.

In FIG. 1C, the reader 150 can be configured to read a payment and/or identity instrument. In some embodiments, the reader 150 can be a certified EMV level 1 contact and/or contact less reader, where EMV stands for Europay, MasterCard, and Visa. In some embodiments, an antenna of the reader 150 can be enabled in a pPOS device enclosure or integrated into an external device. In some embodiments, the external device can be one of the following: wireless charging, WiFi (wireless local area network) communication, Bluetooth or Bluetooth low energy communication, near field magnetic induction (NFMI) communication, and cellular communication. In FIG. 1C, the interface functions with the reader can be performed via the interface 155, which connects the reader 150 to the secure MCF 110. In some embodiments, the interface functions with the reader can be performed via other interfaces (not shown in FIG. 1C), and with other elements of the pPOS device 100C, such as the secure element 130.

In FIG. 1C, the sensor switch 160 can be configured to initiate and/or terminate a transaction. In some embodiments, the sensor switch 160 can be further configured to collect user authentication data. In some embodiments, the sensor switch 160 can be further configured to collect user authentication data and notify a user of a device status.

In some embodiments, the sensor switch 160 includes a biometric sensor. In some embodiments, the biometric sensor is used to collect user biometric data for enrollment and authentication of the user of the device, and/or the transaction from the device to a merchant and/or a merchant acquirer. In some embodiments, the biometric data is managed by the user of the device. In some embodiments, the biometric data can be one or more of the following: a face of the user, a finger of the user, a fingerprint of the user, an iris of the user, a voice of the user, a heart rhythm of the user, a physical attribute of the user.

In some embodiments, the sensor switch 160 includes a touch sensor. In some embodiments, the touch sensor is used to collect user created data for enrollment and authentication of the user of the device, and/or the transaction from the device to a merchant and/or a merchant acquirer. In some embodiments, a touch pattern and a sequence data can be managed by the user of the device using the touch sensor.

In FIG. 1C, the user interface function 170 can provide a status of the device and a state of the transaction. In some embodiments, the user interface function 170 can use one or more of the following interfaces: a visual display, a light, a series of lights, an audio interface, a haptics interface. In some embodiments, the user interface function 170 can also use other interfaces to provide a status of the device and a state of the transaction.

In some embodiments, a pPOS device can provide the following services or functions:
a. Enablement of Point to Point encryption (P2PE) or End to End (E2EE) encryption security
b. Reader to card CVM (customer validation methods) validation of issuer provided CVM data elements
c. Merchant selectable CVM and data elements based on transaction elements and rules
d. Merchant web site integration In some embodiments, a pPOS device can provide for device or transaction activation. For example, this can include tap and/or slide switches for customer creation and validate activation sequences.

Figure 1D:
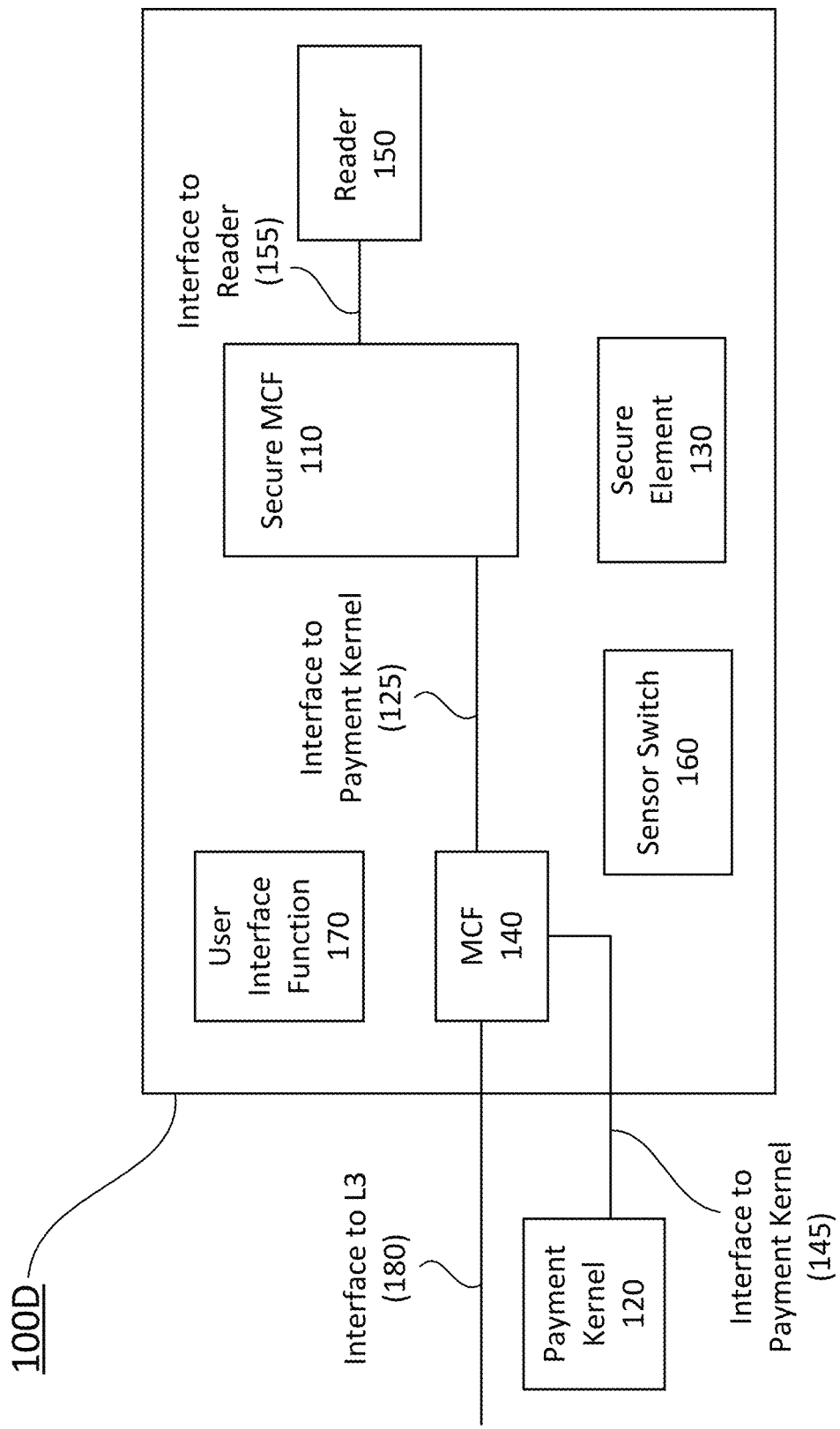
FIG. 1D shows a fourth personal Point of Sale (pPOS) device that is configured to provide for card present e-commerce transactions with a payment kernel remote to the device, in accordance with some example embodiments.

In some embodiments, a pPOS device can provide the following features:
a. Storage of customer's CVMs in a secure element
b. CVM validation of customer CVM
c. Biometric sensors to collect customer biometric
d. Activation switches
e. Display of device status, merchant messages, issuer messages, and on card applet messages FIG. 1D shows a fourth personal Point of Sale (pPOS) device 100D that is configured to provide for card present e-commerce transactions with a payment kernel 120 remote to the device, in accordance with some example embodiments. The pPOS device 100D is very similar to the pPOS device 100C shown in FIG. 1C, except that the payment kernel 120 is remote to the device in the pPOS device 100D, while the payment kernel 120 is local to the device in the pPOS device 100C. Otherwise, all other components and interfaces function in a similar manner for both pPOS device 100C and pPOS device 100D.

Figure 1E:
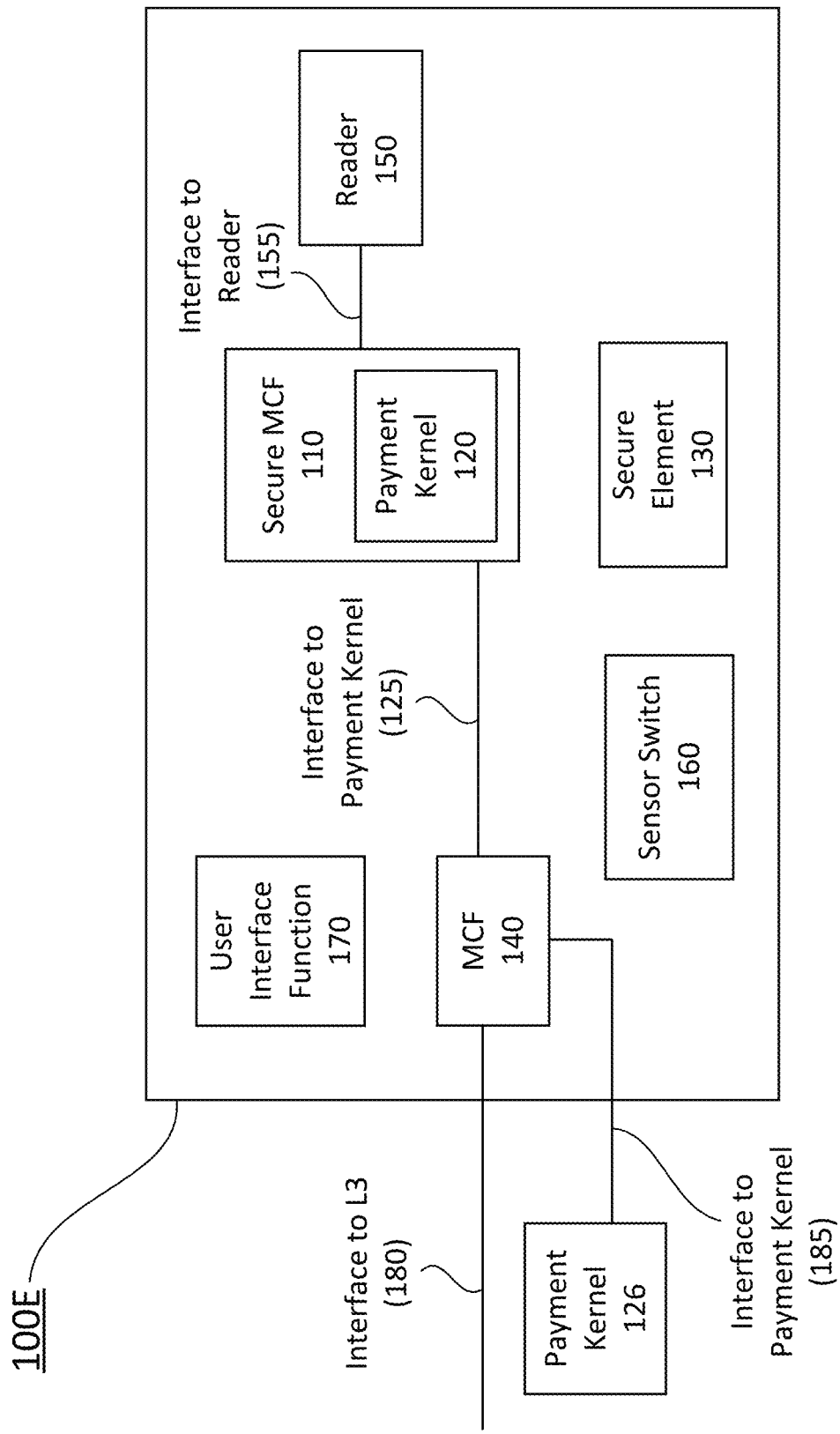
FIG. 1E shows a fifth personal Point of Sale (pPOS) device that is configured to provide for card present e-commerce transactions with a payment kernel split between being local and remote to the device, in accordance with some example embodiments.

FIG. 1E shows a fifth personal Point of Sale (pPOS) device 100E that is configured to provide for card present e-commerce transactions with a payment kernel split between being local and remote to the device, in accordance with some example embodiments. In pPOS device 100E, there is a payment kernel 120 that is local to the device 100E and a payment kernel 126 that is remote to the device 100E. The pPOS device 100E is very similar to the pPOS device 100C (shown in FIG. 1C) and the pPOS device 100D (shown in FIG. 1D), except that the payment kernel is now split between being local and remote to the pPOS device 100E, while the payment kernel is local to the device in the pPOS device 100C and remote to the device in the pPOS device 100D. Otherwise, all other components and interfaces function in a similar manner for all three devices: pPOS device 100C, pPOS device 100D, and pPOS device 100E.

Figure 2A:
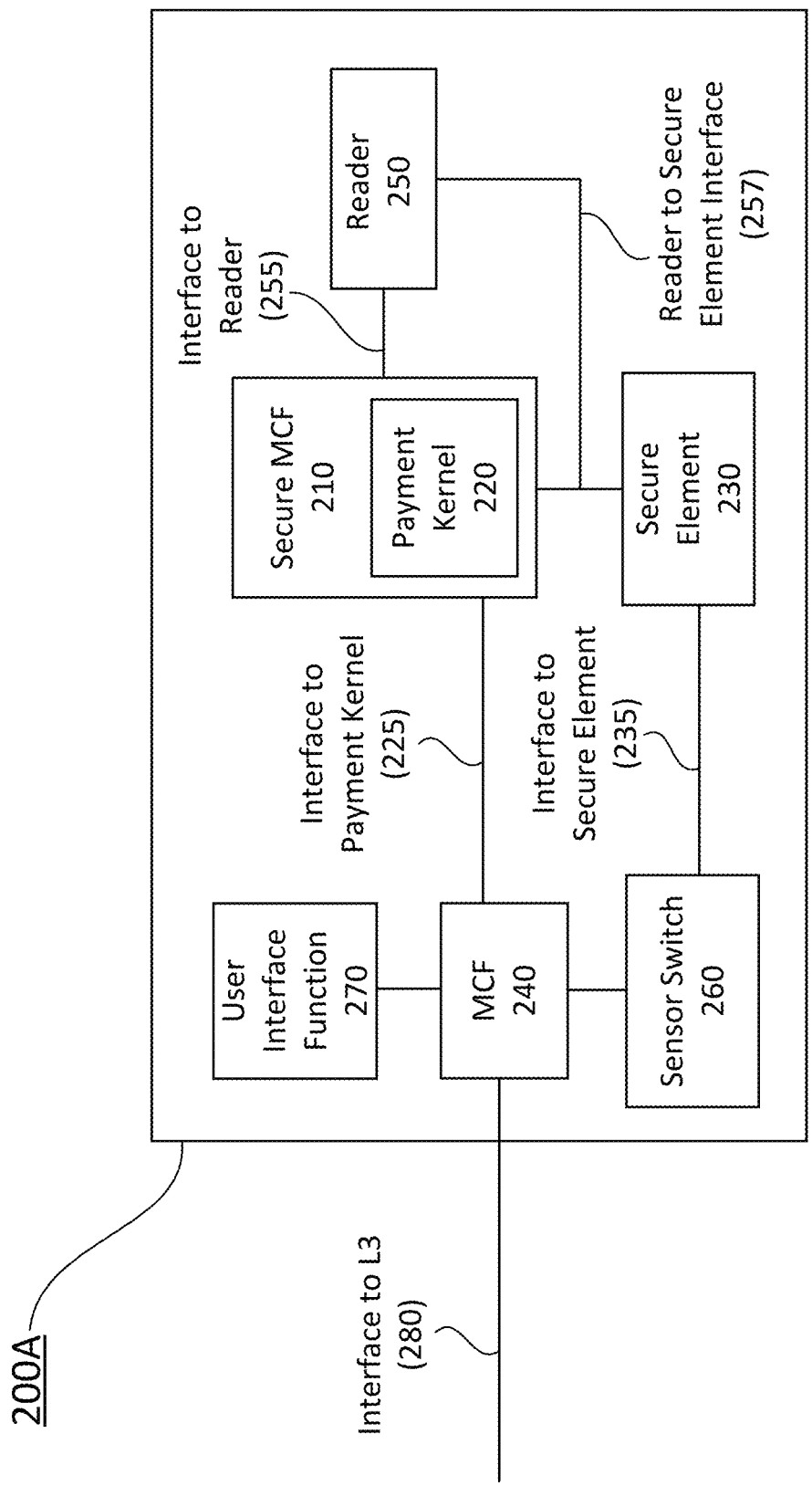
FIG. 2A shows a sixth personal Point of Sale (pPOS) device that is configured to provide for card present e-commerce transactions with a payment kernel local to the device, in accordance with some example embodiments.

FIG. 2A shows a sixth personal Point of Sale (pPOS) device 200A that is configured to provide for card present e-commerce transactions with a payment kernel local to the device, in accordance with some example embodiments. The FIG. 2A pPOS device 200A is similar to the FIG. 1C pPOS device 100C, but the FIG. 2A pPOS 200A provides more details regarding the interfaces that can be used between the various elements of a pPOS device. In particular, FIG. 2A shows that the pPOS device 200A includes most elements that are similar to those elements shown in FIG. 1C. For example, FIG. 2A shows that pPOS device 200A includes a secure microcontroller function (MCF) 210, a payment kernel 220 (which is contained in the secure MCF 210), a secure element 230, a second MCF 240, a reader 250, a sensor switch 260, and a user interface function 270. FIG. 2A also shows that the pPOS device 200A includes an interface 280 to a certified EMV level 3 (L3) payment application (where EMV stands for Europay, MasterCard, and Visa), an interface 225 between the secure MCF 210 and the second MCF 240, and an interface 255 between the secure MCF 210 and the reader 250. All of these elements shown in FIG. 2A can be matched with a corresponding element shown in FIG. 1C (for example: secure MCF 210 can be matched with secure MCF 110; payment kernel 220 can be matched with payment kernel 120; etc.). Furthermore, the functions and properties of the matching elements from the two FIGS. can be very similar or nearly identical (for example: secure MCF 210, like the matching secure MCF 110 from FIG. 1C, can also be configured to provide application and data level encryption and hardware/software tamper detection).

Additionally, FIG. 2A also shows that the pPOS device 200A can include an interface 235 between the secure element 230 and the sensor switch 260, and an interface 257 between the reader 250 and the secure element 230. As an example, interface 235 between the secure element 230 and the sensor switch 260 can be used to help collect user biometric data, since the sensor switch 260 can include a biometric sensor, which is used to collect user biometric data for enrollment and authentication of the user of the device. As another example, interface 257 between the reader 250 and the secure element 230 can be used to help process payment and authentication of a card being read by reader 250, since the secure element 230 can be configured to execute a secure element application that is used for payment and authentication.

Figure 2B:
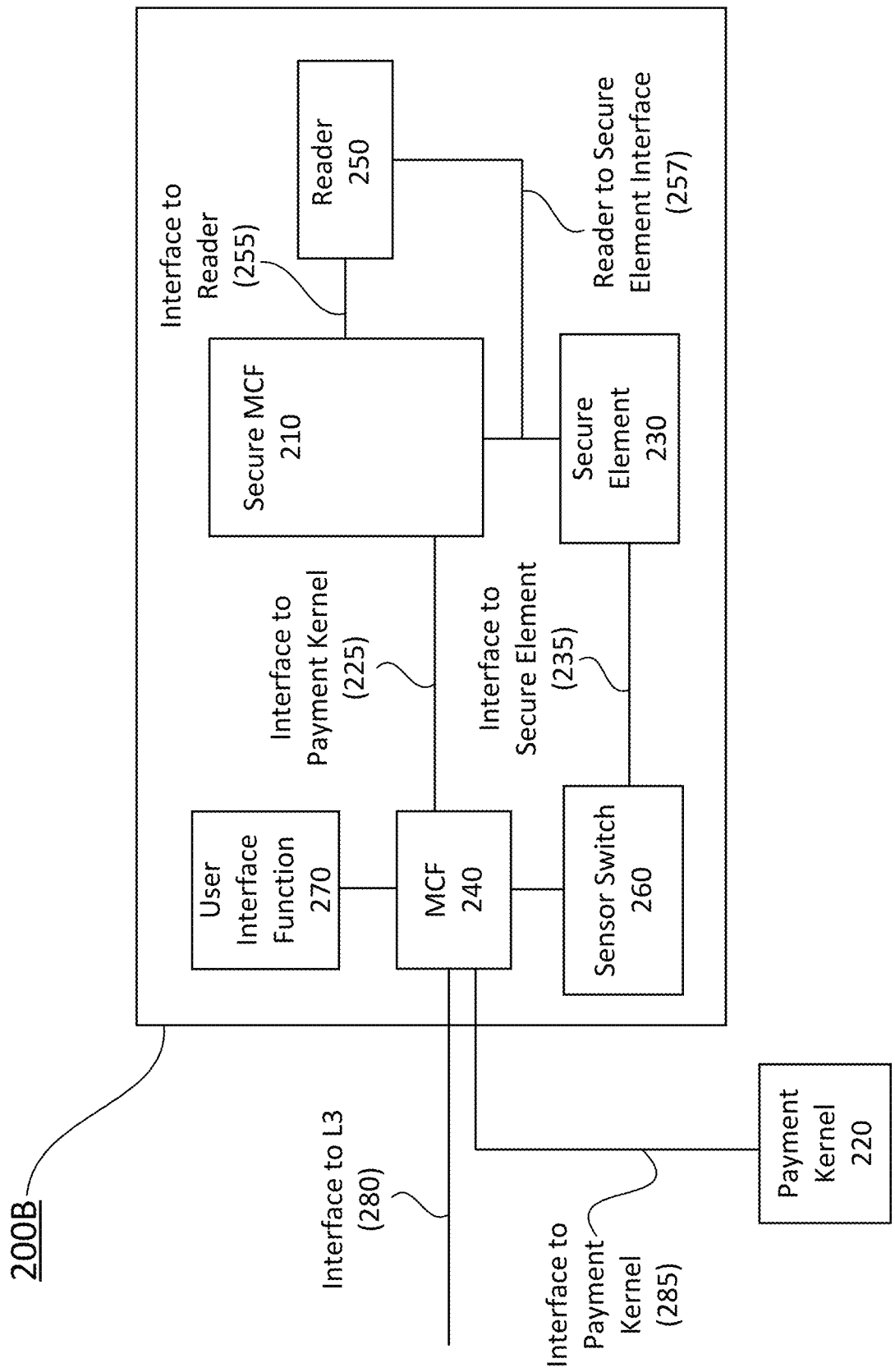
FIG. 2B shows a seventh personal Point of Sale (pPOS) device that is configured to provide for card present e-commerce transactions with a payment kernel remote to the device, in accordance with some example embodiments.

FIG. 2B shows a seventh personal Point of Sale (pPOS) device 200B that is configured to provide for card present e-commerce transactions with a payment kernel 220 remote to the device, in accordance with some example embodiments. The pPOS device 200B is very similar to the pPOS device 200A shown in FIG. 2A, except that the payment kernel 220 is remote to the device in the pPOS device 200B, while the payment kernel 220 is local to the device in the pPOS device 200A. Because payment kernel 220 is remote to pPOS device 200B, there is also an interface 285 connecting MCF 240 to remote payment kernel 220. Otherwise, all other components and interfaces function in a similar manner for both pPOS device 200A and pPOS device 200B.

Figure 2C:
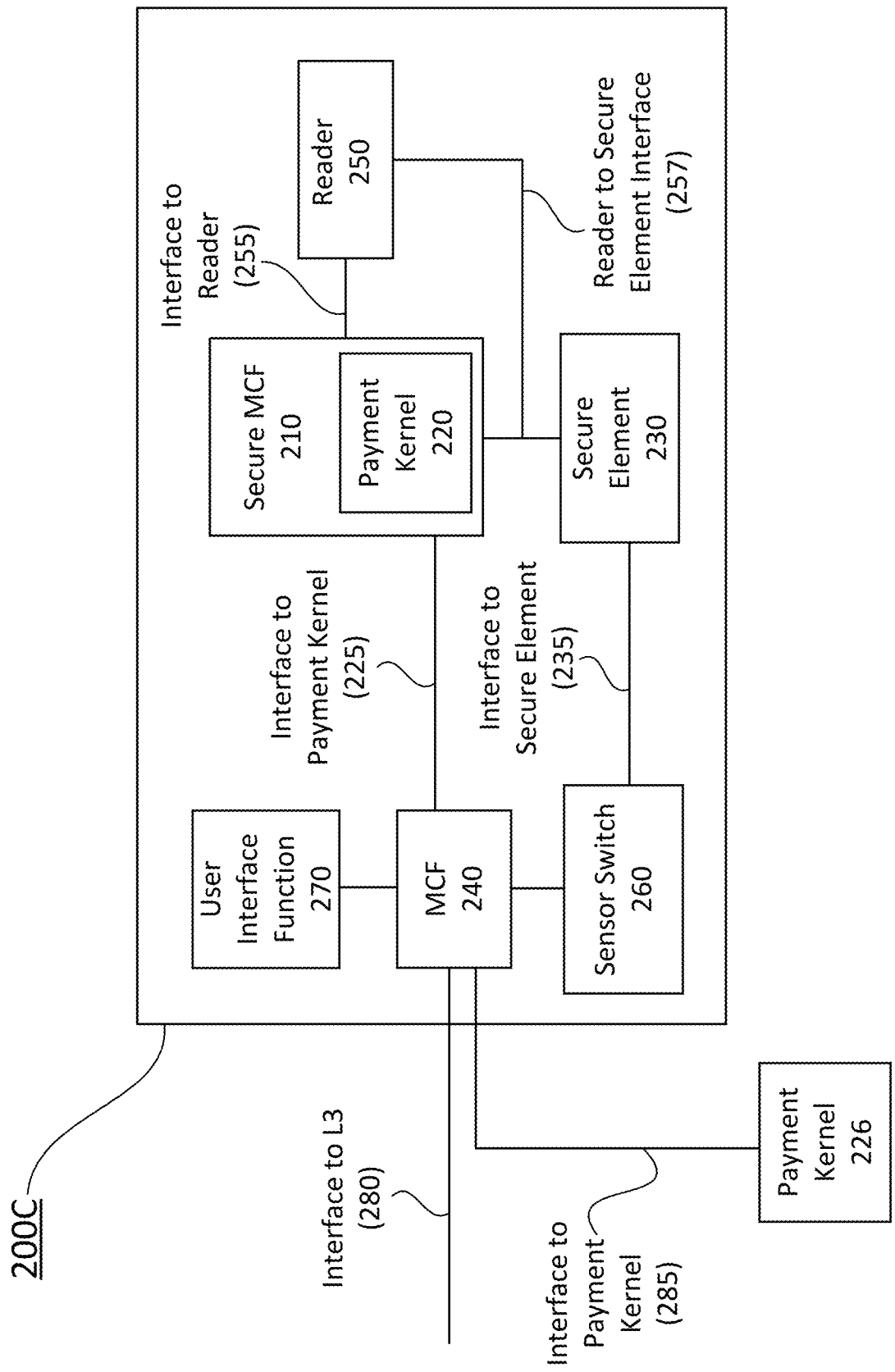
FIG. 2C shows an eighth personal Point of Sale (pPOS) device that is configured to provide for card present e-commerce transactions with a payment kernel split between being local and remote to the device, in accordance with some example embodiments.

FIG. 2C shows an eighth personal Point of Sale (pPOS) device 200C that is configured to provide for card present e-commerce transactions with a payment kernel split between being local and remote to the device, in accordance with some example embodiments. In pPOS device 200C, there is a payment kernel 220 that is local to the device 200C and a payment kernel 226 that is remote to the device 200C. The pPOS device 200C is very similar to the pPOS device 200A (shown in FIG. 2A) and the pPOS device 200B (shown in FIG. 2B), except that the payment kernel is now split between being local and remote to the pPOS device 200C, while the payment kernel is local to the device in the pPOS device 200A and remote to the device in the pPOS device 200B. Otherwise, all other components and interfaces function in a similar manner for all three devices: pPOS device 200A, pPOS device 200B, and pPOS device 200C.

Figure 3A:
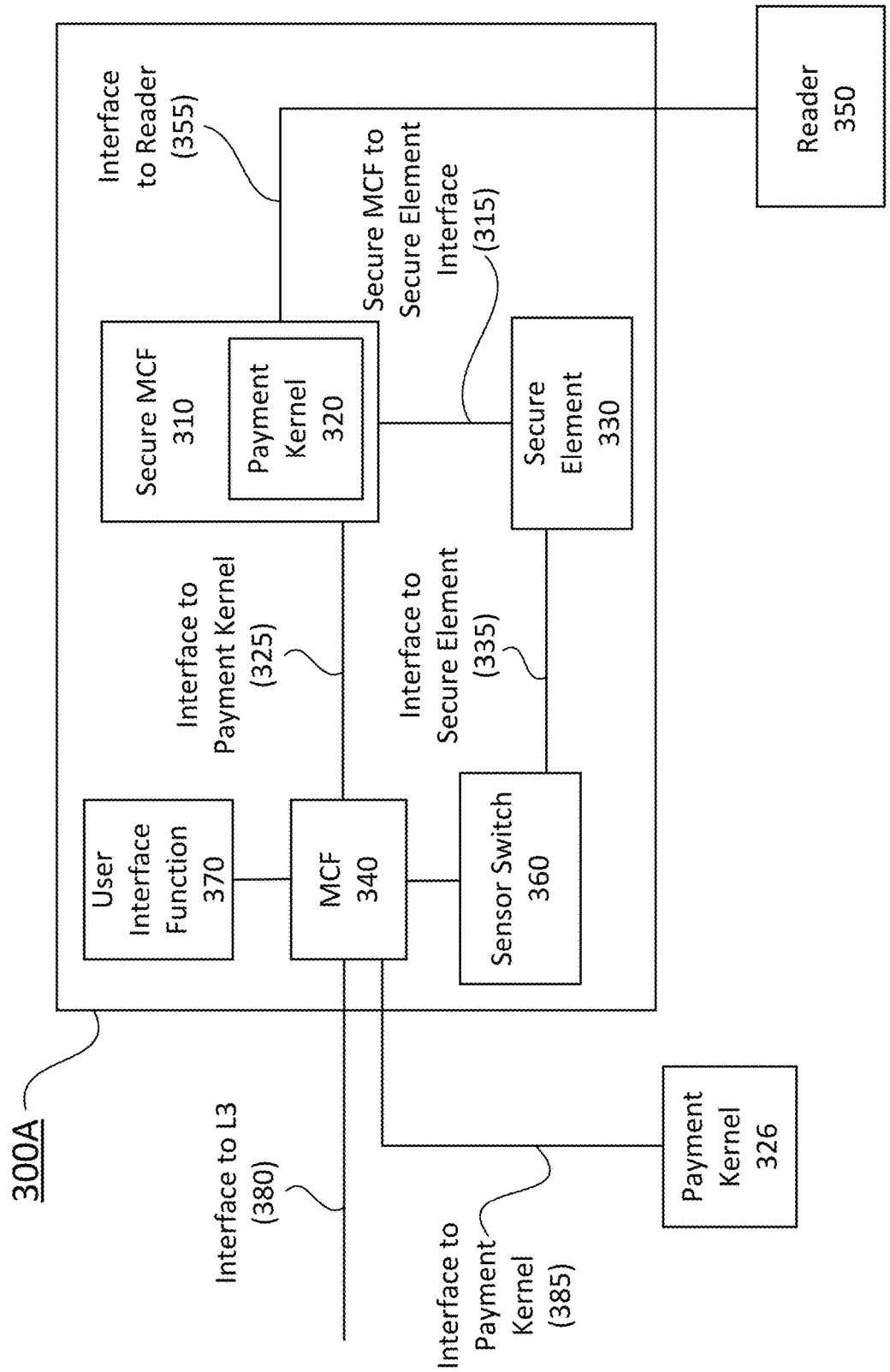
FIG. 3A shows a ninth personal Point of Sale (pPOS) device that is configured to provide for card present e-commerce transactions with a payment kernel split between being local and remote to the device, in accordance with some example embodiments.

FIG. 3A shows a ninth personal Point of Sale (pPOS) device 300A that is configured to provide for card present e-commerce transactions with a payment kernel split between being local and remote to the device, where a reader 350 is external to the pPOS device 300A, in accordance with some example embodiments. The FIG. 3A pPOS device 300A is similar to the FIG. 2C pPOS device 200C, except the reader 350 is external to the pPOS device. In particular, FIG. 3A shows that the pPOS device 300A includes most elements that are similar to those elements shown in FIG. 2C. For example, FIG. 3A shows that pPOS device 300A includes a secure microcontroller function (MCF) 310, a local payment kernel 320 (which is contained in the secure MCF 310), a secure element 330, a second MCF 340, a sensor switch 360, and a user interface function 370. FIG. 3A also shows that the pPOS device 300A includes an interface 380 to a certified EMV level 3 (L3) payment application (where EMV stands for Europay, MasterCard, and Visa), an interface 325 between the secure MCF 310 and the second MCF 340, an interface 355 between the secure MCF 310 and the reader 350, an interface 335 between the sensor switch 360 and the secure element 330, an interface 315 between the secure MCF 310 and the secure element 330, and an interface 385 between the MCF 340 and the remote payment kernel 326. Again, all of these elements shown in FIG. 3A can be matched with a corresponding element shown in FIG. 2C (for example: secure MCF 310 can be matched with secure MCF 210, etc.). Furthermore, the functions and properties of the matching elements from the two FIGS. can be very similar or nearly identical (for example: secure MCF 310, like the matching secure MCF 210 from FIG. 2C, can also be configured to provide application and data level encryption and hardware/software tamper detection).

FIG. 3A also shows a reader 350, which is external to the pPOS device 300A. In some embodiments, the pPOS device 300A can be configured to perform I/O (input/output) functions with the reader 350 using one or more of the following: USB (Universal Serial Bus), audio jack, Bluetooth, WiFi (wireless local area network), NFC (near field communication), near field magnetic induction (NFMI) communication, a remote MCF, and any computer network. Therefore, for example, the pPOS device 300A can perform I/O functions with the reader 350 directly using any computer network (such as PAN (personal area network), LAN (local area network), WAN (wide area network), MAN (metropolitan area network), etc.) in a peer to peer configuration. Or, in another example, the pPOS device 300A can perform I/O functions with the reader 350 indirectly using a remote MCF (in a peer to peer configuration or a tethering configuration). In such a case, the remote MCF can be a laptop computer, a desktop computer, a tablet computer, a smart phone, or any device that can access the internet. Further, the pPOS device 300A can be configured to interface with the remote MCF in a tethering configuration using the audio jack or one of these interface protocols: USB, Bluetooth, WiFi, NFC, NFMI.

Additionally, unlike FIG. 2C (e.g., interface 257), FIG. 3A does not show a direct interface between the reader 350 and the secure element 330. In some embodiments, such a configuration to route the reader through the secure MCF 210 can be desirable, because of security reasons.

Figure 3B:
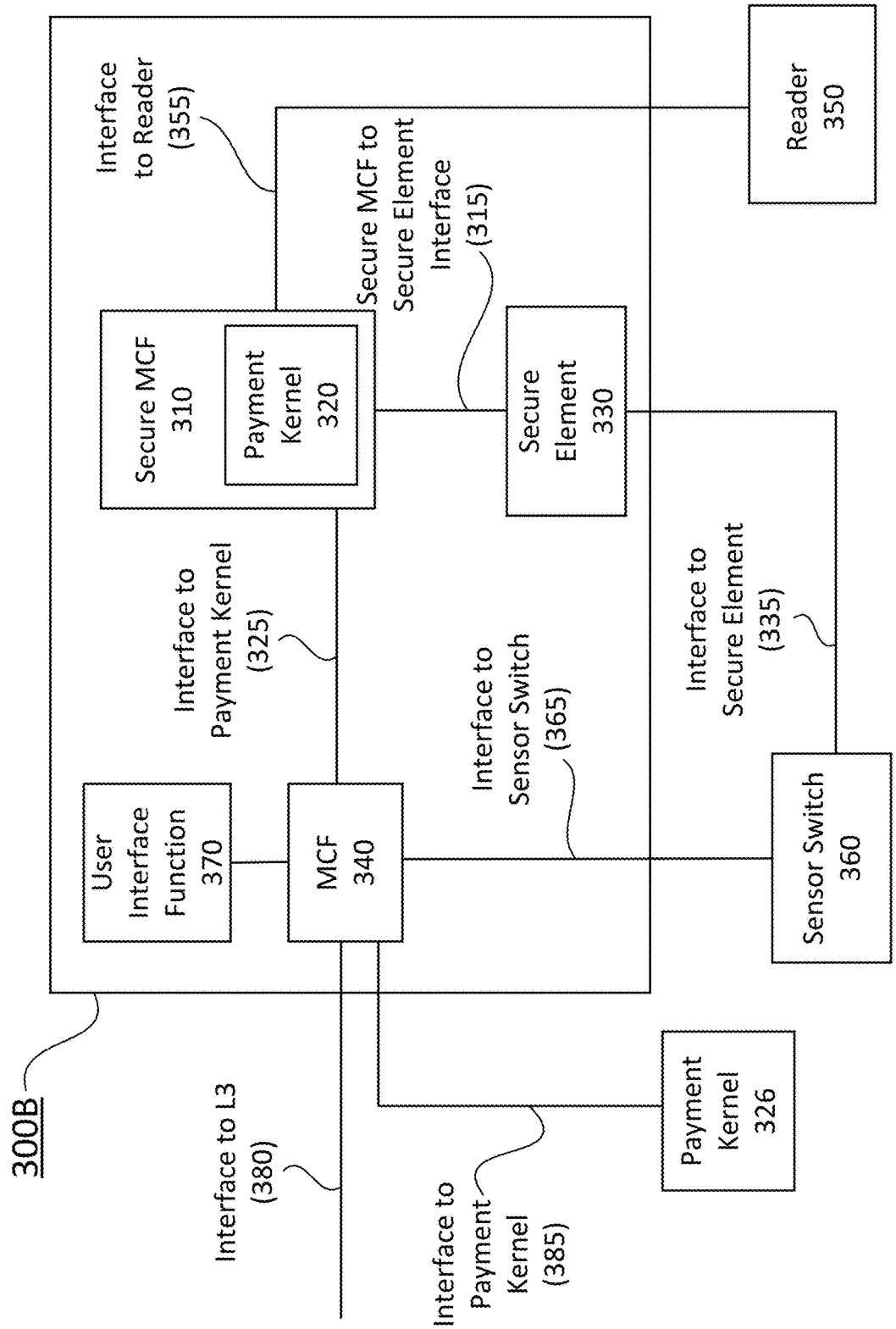
FIG. 3B shows a tenth personal Point of Sale (pPOS) device that is configured to provide for card present e-commerce transactions with a payment kernel split between being local and remote to the device, in accordance with some example embodiments.

FIG. 3B shows a personal Point of Sale (pPOS) device 300B that is configured to provide for card present e-commerce transactions, where a reader and a sensor switch are external to the pPOS device 300B. The FIG. 3B pPOS device 300B is similar to the FIG. 2C pPOS device 200C, except the reader 350 and the sensor switch 360 are external to the pPOS device. The FIG. 3B pPOS device 300B is similar to the FIG. 3A pPOS device 300A, except the sensor switch 360 is external to the pPOS device. In particular, FIG. 3B shows that the pPOS device 300B includes most elements that are similar to those elements shown in FIGS. 2C and 3A. FIG. 3B also shows that the pPOS device 300B includes interfaces that are similar to those shown in FIG. 3A. Again, the functions and properties of the matching elements and interfaces from the three FIGS. can be very similar or nearly identical.

FIG. 3B shows that the sensor switch 360 can be external to the pPOS device. In some embodiments, the pPOS device 300B can be configured to perform I/O (input/output) functions with the sensor switch 360 using one or more of the following: USB (Universal Serial Bus), audio jack, Bluetooth, WiFi (wireless local area network), NFC (near field communication), near field magnetic induction (NFMI) communication, a remote MCF, and any computer network. Therefore, for example, the pPOS device 300B can perform I/O functions with the sensor switch 360 indirectly using a remote MCF (in a peer to peer configuration or a tethering configuration). In such a case, the remote MCF can be a laptop computer, a desktop computer, a tablet computer, a smart phone, or any device that can access the internet. Further, the pPOS device 300B can be configured to interface with the remote MCF in a tethering configuration using the audio jack or one of these interface protocols: USB, Bluetooth, WiFi, NFC, NFMI. As a specific example to this, the pPOS device 300B can be connected to a laptop computer through a USB connection, and the sensor switch 360 can be a fingerprint reader of the laptop computer. Alternatively, in another example, if there is available a stand-alone sensor switch, then the pPOS device 300B can perform I/O functions with the sensor switch 360 directly using USB, audio jack, Bluetooth, WiFi, NFC, NFMI, or any computer network.

Additionally, like FIG. 3A (e.g., interface 335), FIG. 3B also shows a direct interface between the sensor switch 360 and the secure element 330. In some embodiments, such a configuration to directly route the sensor switch 360 to the secure element 330 can be undesirable for security reasons. Therefore, in some embodiments, the sensor switch 360 can be routed to the secure element 330 via the MCF 340 and/or the secure MCF 310, so that interface 335 is removed. However, if there are no security concerns and direct routing is possible, then the direct interface 335 might have some advantages of faster speed and simpler implementation.

Figure 3C:
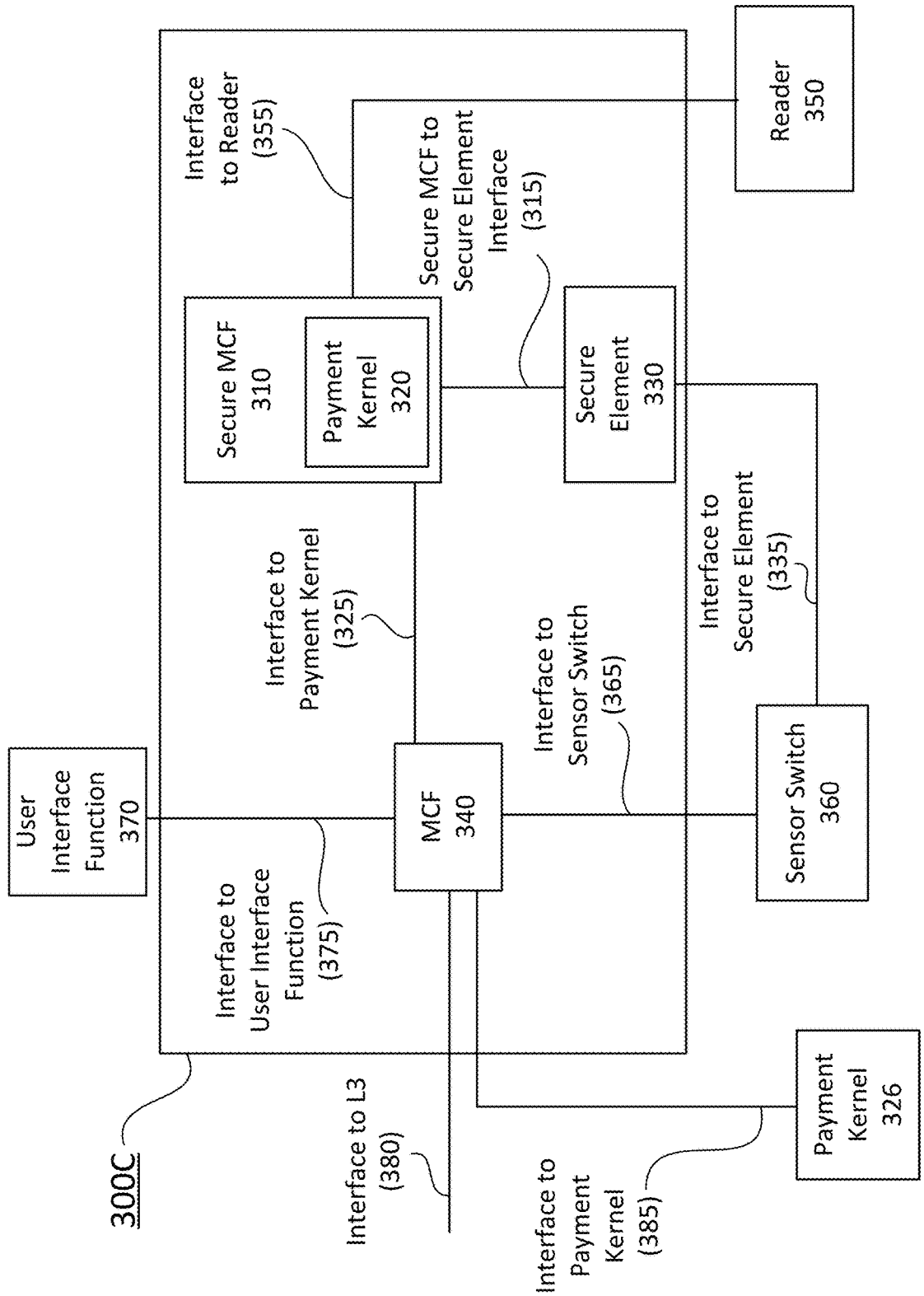
FIG. 3C shows an eleventh personal Point of Sale (pPOS) device that is configured to provide for card present e-commerce transactions with a payment kernel split between being local and remote to the device, in accordance with some example embodiments.

FIG. 3C shows an eleventh personal Point of Sale (pPOS) device 300C that is configured to provide for card present e-commerce transactions with a payment kernel split between being local and remote to the device, where a reader, a sensor switch, and a user interface function are external to the pPOS device 300C, in accordance with some example embodiments. The FIG. 3C pPOS device 300C is similar to the FIG. 2C pPOS device 200C, except the reader 350, the sensor switch 360, and the user interface function 370 are all external to the pPOS device. The FIG. 3C pPOS device 300C is similar to the FIGS. 3A and 3B pPOS devices, except the user interface function 370 is external to the pPOS device. Again, all elements and interfaces shown in FIGS. 2C, 3A, 3B, and 3C are similar, with very similar or nearly identical functions and properties for all matching elements and interfaces.

FIG. 3C shows that the user interface function 370 can be external to the pPOS device. In some embodiments, the pPOS device 300C can be configured to perform I/O (input/output) functions with the user interface function 370 using one or more of the following: USB (Universal Serial Bus), audio jack, Bluetooth, WiFi (wireless local area network), NFC (near field communication), near field magnetic induction (NFMI) communication, a remote MCF, and any computer network. Therefore, for example, the pPOS device 300C can perform I/O functions with the user interface function 370 indirectly using a remote MCF. In such a case, the remote MCF can be a laptop computer, a desktop computer, a tablet computer, a smart phone, or any device that can access the internet. Further, the pPOS device 300C can be configured to interface with the remote MCF in a tethering configuration using the audio jack or one of these interface protocols: USB, Bluetooth, WiFi, NFC, NFMI. As a specific example to this, the pPOS device 300C can be connected to a laptop computer through a USB connection, and the user interface function 370 can be a display screen of the laptop computer. Alternatively, in another example, if there is available a stand-alone user interface function, then the pPOS device 300C can perform I/O functions with the user interface function 370 directly using USB, audio jack, Bluetooth, WiFi, NFC, NFMI, or any computer network.

Figure 3D:
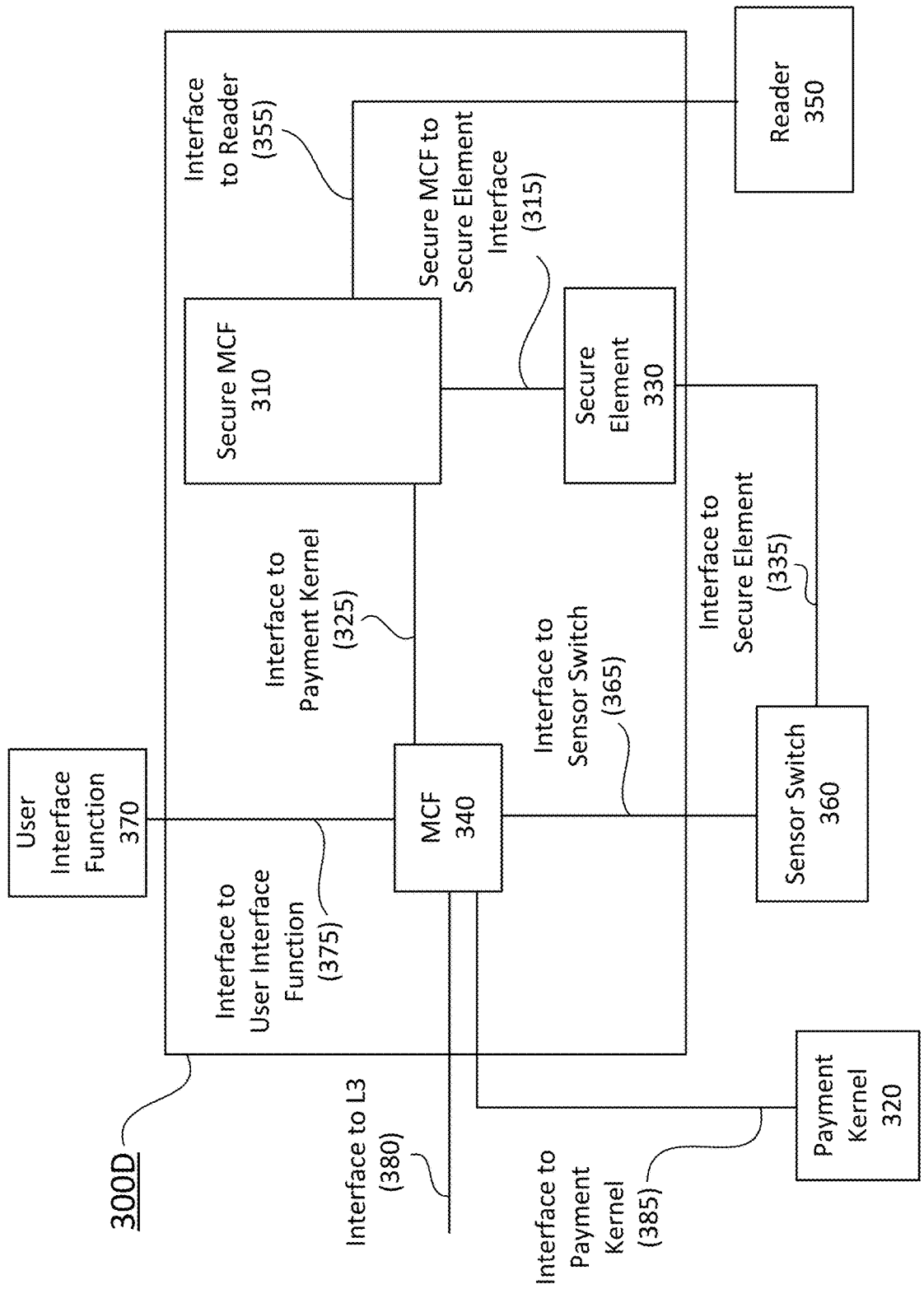
FIG. 3D shows a twelfth personal Point of Sale (pPOS) device that is configured to provide for card present e-commerce transactions with a payment kernel remote to the device, in accordance with some example embodiments.

FIG. 3D shows a twelfth personal Point of Sale (pPOS) device 300D that is configured to provide for card present e-commerce transactions with a payment kernel remote to the device, where a reader, a sensor switch, and a user interface function are external to the pPOS device 300D, in accordance with some example embodiments. The FIG. 3D pPOS device 300D is similar to the FIG. 2B pPOS device 200B, except the reader 350, the sensor switch 360, and the user interface function 370 are all external to the pPOS device. The FIG. 3D pPOS device 300D is similar to the FIG. 3C pPOS device 300C, except the payment kernel is remote to the pPOS device. Again, all elements and interfaces shown in FIGS. 2B, 3C, and 3D are similar, with very similar or nearly identical functions and properties for all matching elements and interfaces.

Figure 4A:
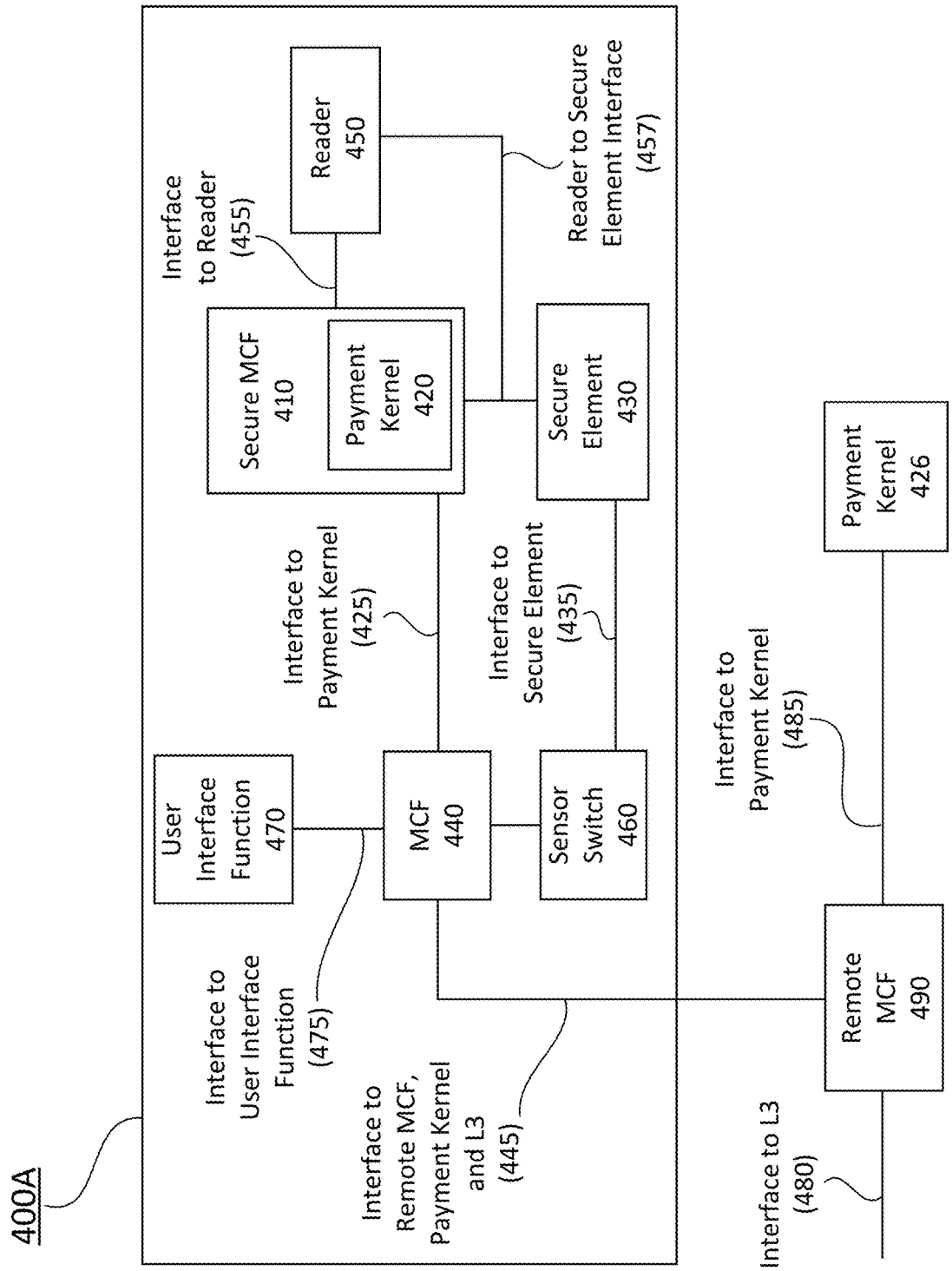
FIG. 4A shows a thirteenth personal Point of Sale (pPOS) device that is configured to provide for card present e-commerce transactions with a payment kernel split between being local and remote to the device, in accordance with some example embodiments.

FIG. 4A shows a thirteenth personal Point of Sale (pPOS) device 400A that is configured to provide for card present e-commerce transactions with a payment kernel split between being local and remote to the device, where a remote MCF (microcontroller function) acts to interface the pPOS device 400A to a remote payment kernel 426 and to a certified EMV level 3 (L3) payment application. The FIG. 4A pPOS device 400A is similar to the FIG. 2C pPOS device 200C, except the FIG. 4A pPOS device 400A uses a remote MCF 490 to interface with a remote payment kernel 426 and a certified EMV level 3 (L3) payment application. In some embodiments, the remote MCF 490 can be a laptop computer, a desktop computer, a tablet computer, a smart phone, or any device that can access the internet. Then pPOS device 400A can be interfaced with the remote MCF 490 in a tethering configuration using the audio jack or one of these interface protocols: USB, Bluetooth, WiFi, NFC, NFMI. In particular, FIG. 4A shows that the pPOS device 400A includes all elements and interfaces that are similar to those shown in FIG. 2C. For example, FIG. 4A shows that pPOS device 400A includes a secure microcontroller function (MCF) 410, a payment kernel 420 (which is contained in the secure MCF 410), a secure element 430, a second MCF 440, a reader 450, a sensor switch 460, and a user interface function 470. FIG. 4A also shows that the pPOS device 400A includes an interface 445 to a remote MCF (which is further interfaced with a remote payment kernel 426 and a certified EMV level 3 (L3) payment application), an interface 425 between the secure MCF 410 and the second MCF 440, an interface 455 between the secure MCF 410 and the reader 450, an interface 435 between the sensor switch 460 and the secure element 430, an interface 475 between the MCF 440 and the user interface function 470, and an interface 457 between the reader 450 and the secure element 430. Again, all of the elements and interfaces shown in FIG. 4A can be matched with a corresponding element and interface shown in FIG. 2C, and all matching elements and interfaces have very similar or nearly identical functions and properties.

FIG. 4A shows that pPOS device 400A can be interfaced with a remote payment kernel 426 and a certified EMV level 3 (L3) payment application via a remote MCF 490. In some embodiments, the remote MCF 490 can be a laptop computer, a desktop computer, a tablet computer, a smart phone, or any device that can access the internet. In some embodiments, the pPOS device 400A can be configured to interface with the remote MCF 490 using one or more of the following: USB (Universal Serial Bus), audio jack, Bluetooth, WiFi (wireless local area network), NFC (near field communication), near field magnetic induction (NFMI) communication, and any computer network. This means that interface 445 can be one or more of the following: USB, audio jack, Bluetooth, WiFi, NFC, NFMI, and any computer network.

In FIG. 4A, the pPOS device 400A is interfaced with the remote MCF 490 through an interface 445 that is between the MCF 440 and the remote MCF 490. In some embodiments, the pPOS device 400 can be interfaced with the remote MCF 490 through another interface (not shown in FIG. 4) that connects the remote MCF 490 directly with the secure MCF 410.

Figure 4B:
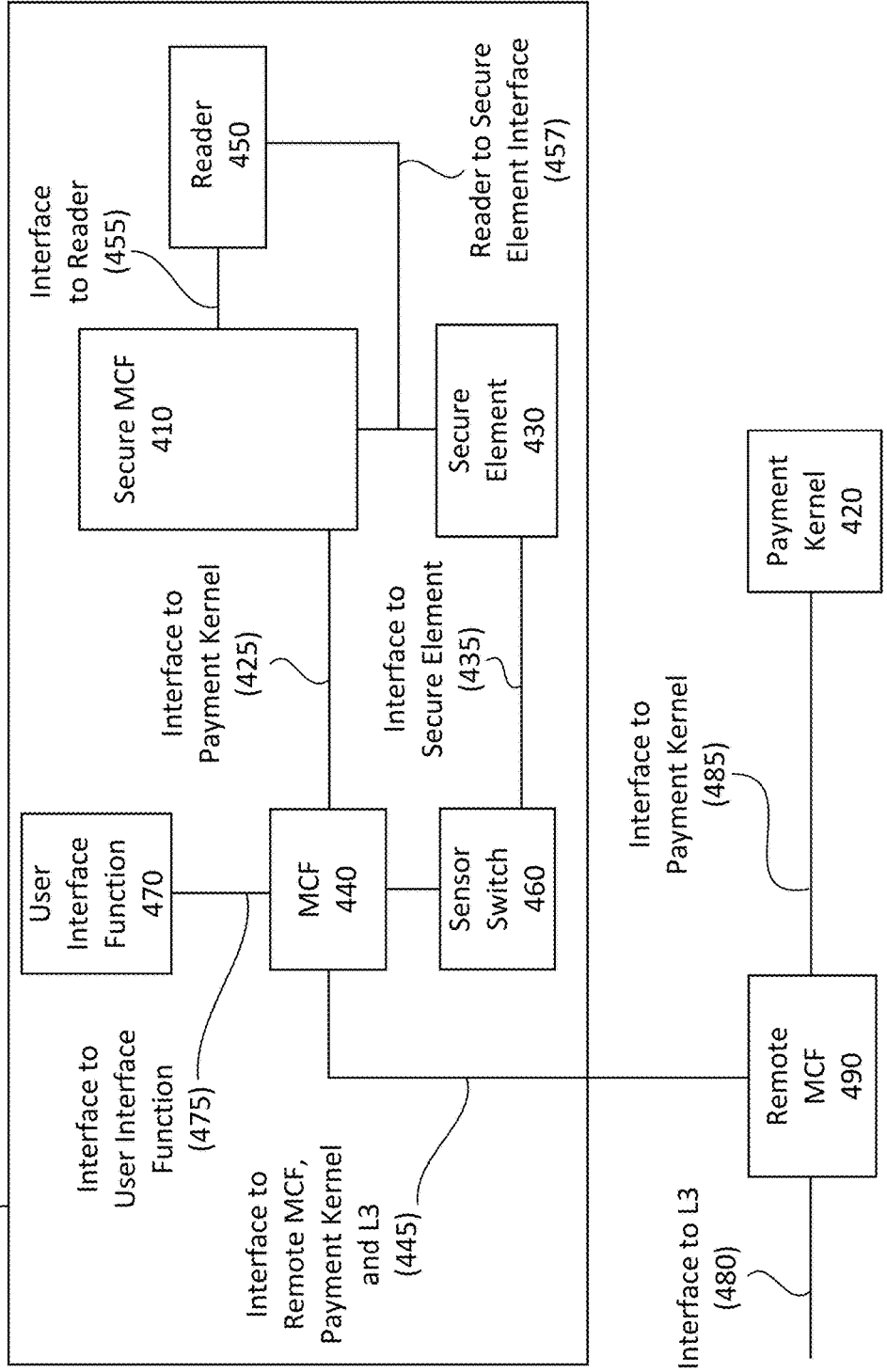
FIG. 4B shows a fourteenth personal Point of Sale (pPOS) device that is configured to provide for card present e-commerce transactions with a payment kernel remote to the device, in accordance with some example embodiments.

FIG. 4B shows a fourteenth personal Point of Sale (pPOS) device 400B that is configured to provide for card present e-commerce transactions with a payment kernel 420 remote to the device, in accordance with some example embodiments. The pPOS device 400B is very similar to the pPOS device 400A shown in FIG. 4A, except that the payment kernel 420 is remote to the device in the pPOS device 400B, while the payment kernel is split between being local and remote to the pPOS device 400A. Otherwise, all other components and interfaces function in a similar manner for both pPOS device 400B and pPOS device 400A.

Figure 5:
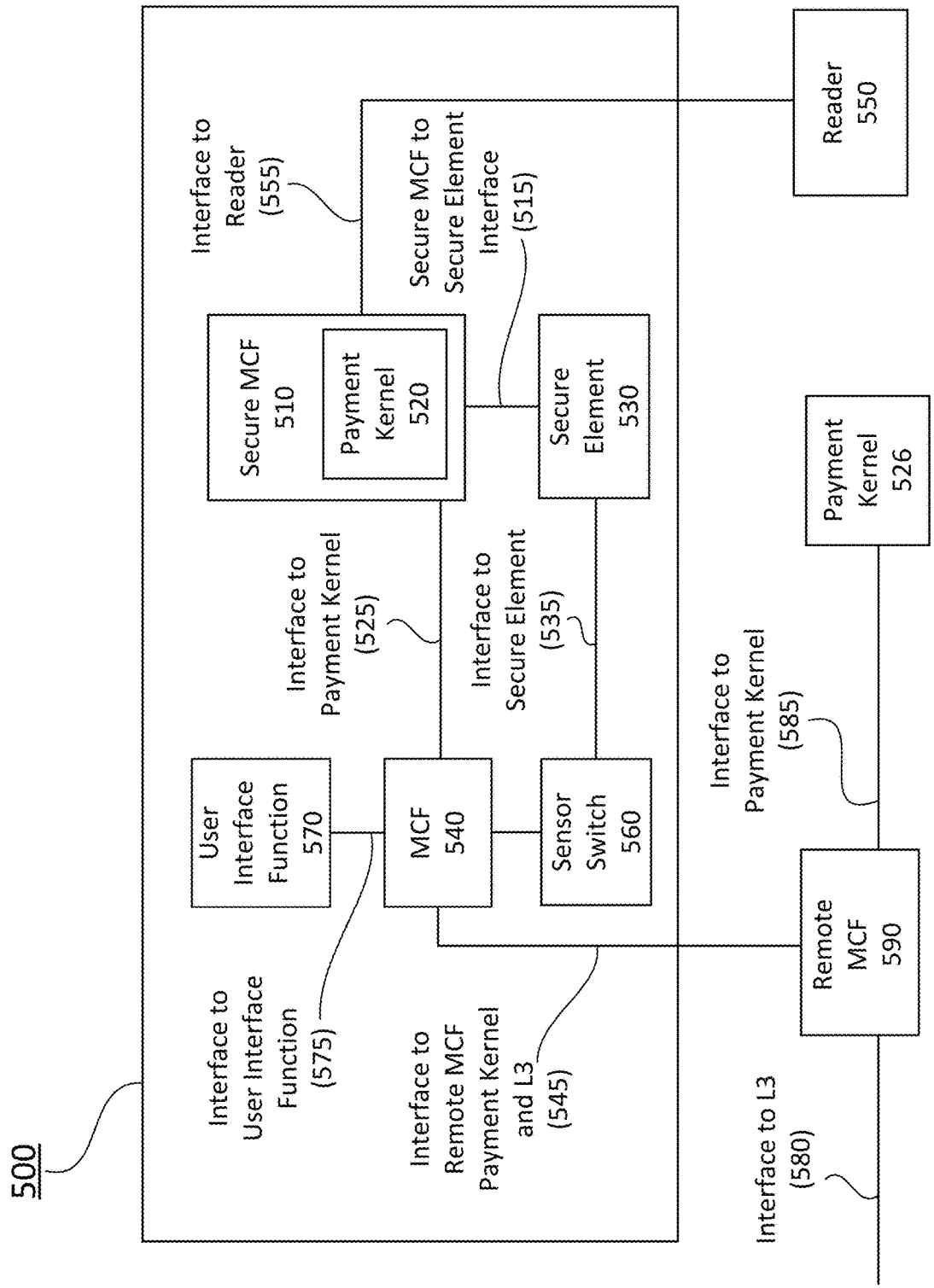
FIG. 5 shows a fifteenth personal Point of Sale (pPOS) device that is configured to provide for card present e-commerce transactions with a payment kernel split between being local and remote to the device, in accordance with some example embodiments.

FIG. 5 shows a fifteenth personal Point of Sale (pPOS) device 500 that is configured to provide for card present e-commerce transactions with a payment kernel split between being local and remote to the device, where a reader 550 is external to the pPOS device 500, in accordance with some example embodiments. The FIG. 5 pPOS device 500 is similar to the FIG. 4A pPOS device 400A, except the reader 550 is external to the pPOS device. In particular, FIG. 5 shows that the pPOS device 500 includes most elements that are similar to those elements shown in FIG. 4A. For example, FIG. 5 shows that pPOS device 500 includes a secure microcontroller function (MCF) 510, a local payment kernel 520 (which is contained in the secure MCF 510), a secure element 530, a second MCF 540, a sensor switch 560, and a user interface function 570. FIG. 5 also shows that the pPOS device 500 includes an interface 545 to a remote MCF 590 (which is further interfaced with a remote payment kernel 526 and a certified EMV level 3 (L3) payment application), an interface 525 between the secure MCF 510 and the second MCF 540, an interface 555 between the secure MCF 510 and the reader 550, an interface 535 between the sensor switch 560 and the secure element 530, an interface 515 between the secure MCF 510 and the secure element 530. Additionally, external to pPOS device 500, there is also an interface 585 between the MCF 590 and the remote payment kernel 526. Again, all of these elements shown in FIG. 5 can be matched with a corresponding element shown in FIG. 4A (for example: secure MCF 510 can be matched with secure MCF 410, etc.). Furthermore, the functions and properties of the matching elements from the two FIGS. can be very similar or nearly identical (for example: secure MCF 510, like the matching secure MCF 410 from FIG. 4A, can also be configured to provide application and data level encryption and hardware/software tamper detection).

FIG. 5 also shows a reader 550, which is external to the pPOS device 500. In some embodiments, the pPOS device 500 can be configured to perform I/O (input/output) functions with the reader 550 using one or more of the following: USB (Universal Serial Bus), audio jack, Bluetooth, WiFi (wireless local area network), NFC (near field communication), near field magnetic induction (NFMI) communication, a remote MCF, and any computer network. Therefore, for example, the pPOS device 500 can perform I/O functions with the reader 550 directly using any computer network (such as PAN (personal area network), LAN (local area network), WAN (wide area network), MAN (metropolitan area network), etc.) in a peer to peer configuration. Or, in another example, the pPOS device 500 can perform I/O functions with the reader 550 indirectly using a remote MCF (in a peer to peer configuration or a tethering configuration). In such a case, the remote MCF can be a laptop computer, a desktop computer, a tablet computer, a smart phone, or any device that can access the internet. Further, the pPOS device 500 can be configured to interface with the remote MCF in a tethering configuration using the audio jack or one of these interface protocols: USB, Bluetooth, WiFi, NFC, NFMI.

Additionally, unlike FIG. 4A (e.g., interface 457), FIG. 5 does not show a direct interface between the reader 550 and the secure element 530. In some embodiments, such a configuration to route the reader through the secure MCF 510 can be desirable, because of security reasons.

Figure 6:
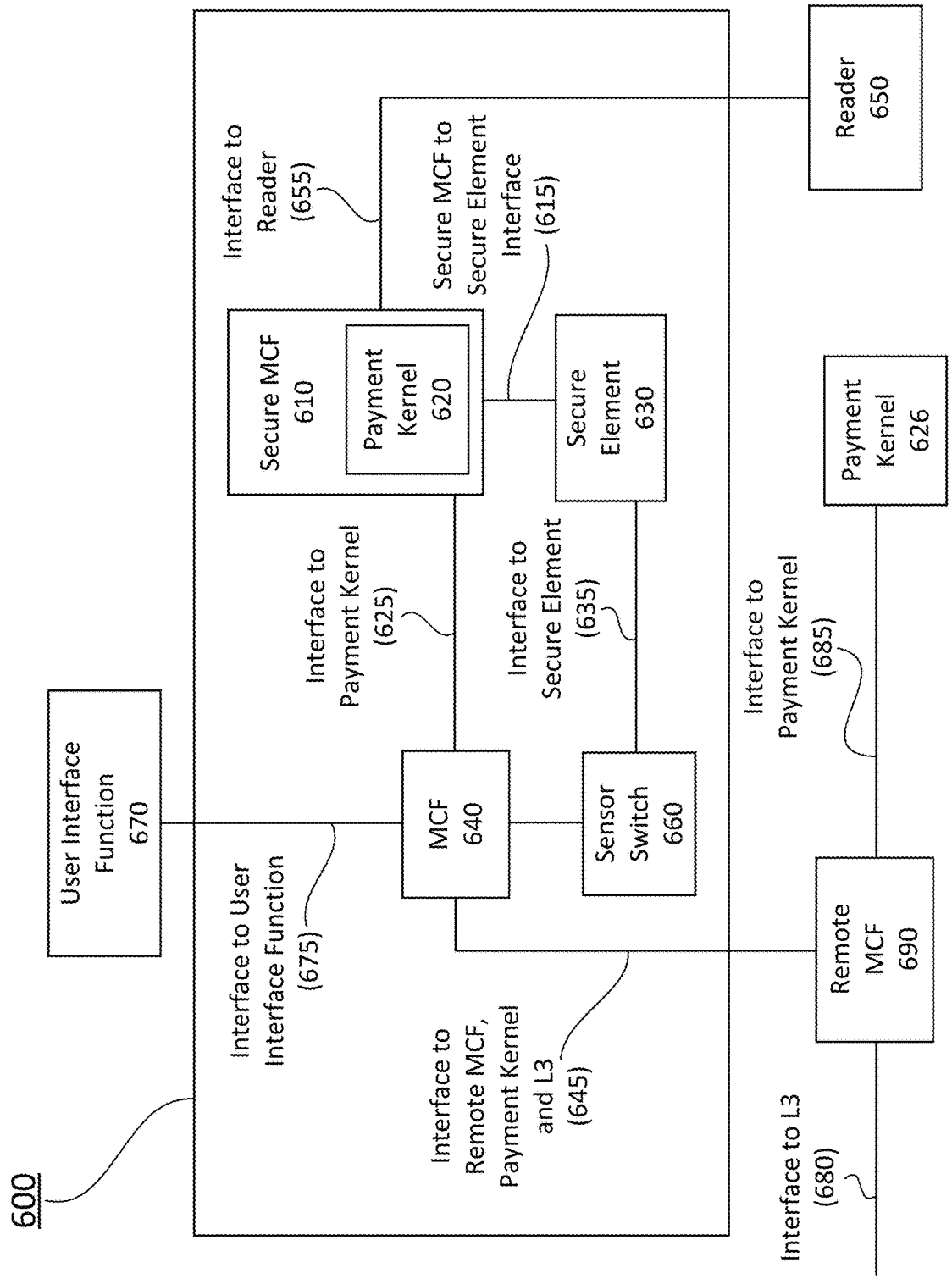
FIG. 6 shows a sixteenth personal Point of Sale (pPOS) device that is configured to provide for card present e-commerce transactions with a payment kernel split between being local and remote to the device, in accordance with some example embodiments.

FIG. 6 shows a sixteenth personal Point of Sale (pPOS) device 600 that is configured to provide for card present e-commerce transactions with a payment kernel split between being local and remote to the device, where a reader and a user interface function are external to the pPOS device, in accordance with some example embodiments. The FIG. 6 pPOS device 600 is similar to the FIG. 5 pPOS device 500, except the user interface function 670 is external to the pPOS device. In particular, FIG. 6 shows that the pPOS device 600 includes all elements and interfaces that are similar to those shown in FIG. 5. For example, FIG. 6 shows that pPOS device 600 includes a secure microcontroller function (MCF) 610, a local payment kernel 620 (which is contained in the secure MCF 610), a secure element 630, a second MCF 640, and a sensor switch 660. FIG. 6 also shows that the pPOS device 600 includes an interface 645 to a remote MCF 690 (which is further interfaced with a remote payment kernel 626 and a certified EMV level 3 (L3) payment application), an interface 625 between the secure MCF 610 and the second MCF 640, an interface 655 between the secure MCF 610 and the reader 650, an interface 635 between the sensor switch 660 and the secure element 630, an interface 675 between the MCF 640 and the user interface function 670, and an interface 615 between the secure MCF 610 and the secure element 630. Again, all of the elements and interfaces shown in FIG. 6 can be matched with a corresponding element and interface shown in FIG. 5, and all matching elements and interfaces have very similar or nearly identical functions and properties.

FIG. 6 shows that pPOS device 600 can be interfaced with a certified EMV level 3 payment application and a remote payment kernel 626 via a remote MCF 690. In some embodiments, the remote MCF 690 can be a laptop computer, a desktop computer, a tablet computer, a smart phone, or any device that can access the internet. In some embodiments, the pPOS device 600 can be configured to interface with the remote MCF 690 using one or more of the following: USB (Universal Serial Bus), audio jack, Bluetooth, WiFi (wireless local area network), NFC (near field communication), near field magnetic induction (NFMI) communication, and any computer network. This means that interface 645 can be one or more of the following: USB, audio jack, Bluetooth, WiFi, NFC, NFMI, and any computer network.

FIG. 6 shows that the reader 650 can be external to the pPOS device. In some embodiments, the pPOS device 600 can be configured to perform I/O (input/output) functions with the reader 650 using one or more of the following: USB (Universal Serial Bus), audio jack, Bluetooth, WiFi (wireless local area network), NFC (near field communication), near field magnetic induction (NFMI) communication, a remote MCF, and any computer network.

FIG. 6 shows that the user interface function 670 can be external to the pPOS device. In some embodiments, the pPOS device 600 can be configured to perform I/O (input/output) functions with the user interface function 670 using one or more of the following: USB (Universal Serial Bus), audio jack, Bluetooth, WiFi (wireless local area network), NFC (near field communication), near field magnetic induction (NFMI) communication, a remote MCF, and any computer network.

As an example to FIG. 6, the pPOS device 600 can be connected to a computer through a USB connection. Then, in some embodiments, the user interface function 670 can be a display screen of the computer.

Figure 7A:
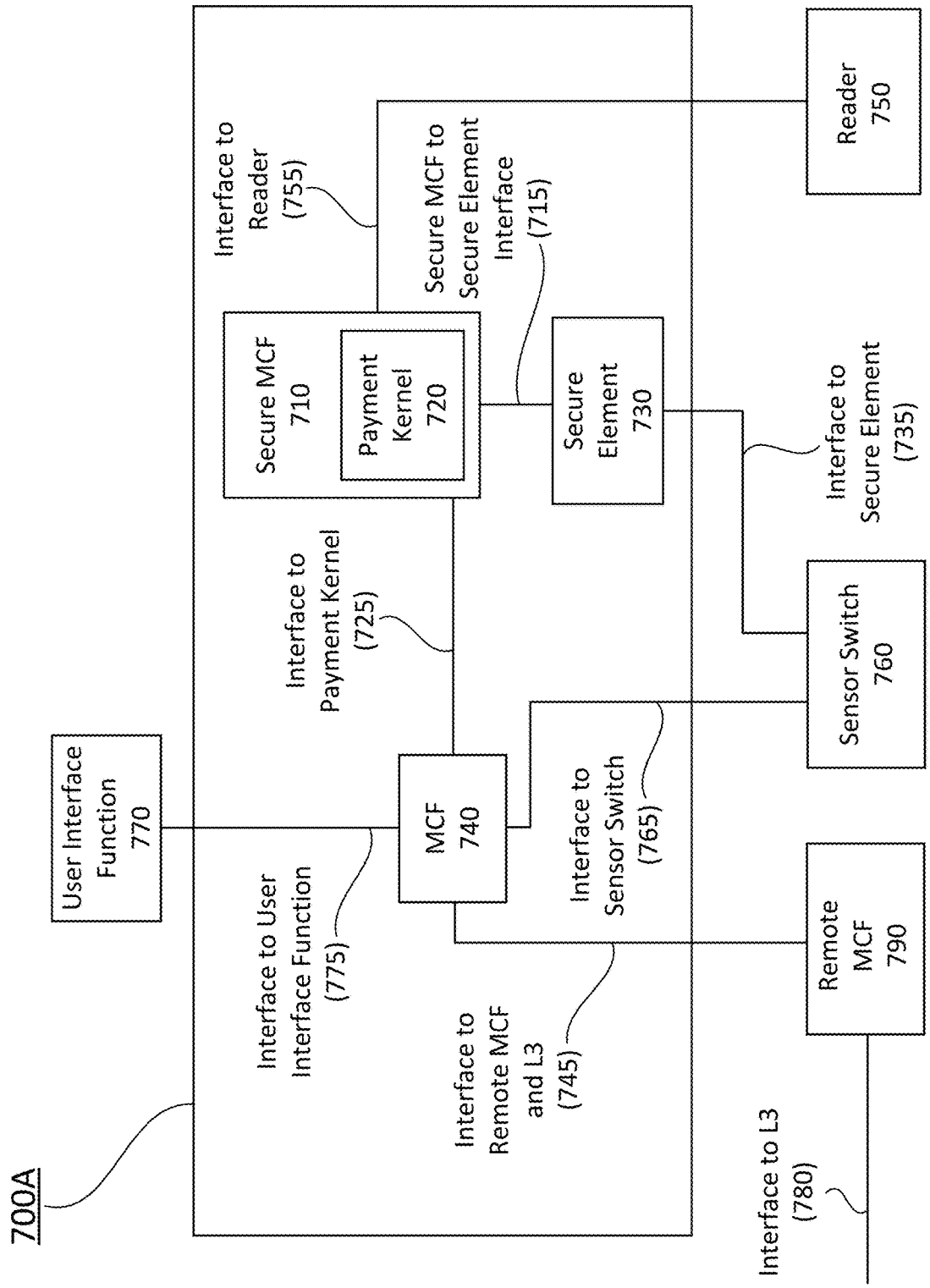
FIG. 7A shows a seventeenth personal Point of Sale (pPOS) device that is configured to provide for card present e-commerce transactions with a payment kernel local to the device, in accordance with some example embodiments.

FIG. 7A shows a seventeenth personal Point of Sale (pPOS) device 700A that is configured to provide for card present e-commerce transactions with a payment kernel local to the device, where a reader, a user interface function, and a sensor switch are external to the pPOS device, in accordance with some example embodiments. The FIG. 7A pPOS device 700A is similar to the FIG. 6 pPOS device 600, except the sensor switch 760 is external to the pPOS device and there is only a local payment kernel 720 (i.e., there is no remote payment kernel). In particular, FIG. 7A shows that the pPOS device 700A includes all elements and interfaces that are similar to those shown in FIG. 6. For example, FIG. 7A shows that pPOS device 700A includes a secure microcontroller function (MCF) 710, a local payment kernel 720 (which is contained in the secure MCF 710), a secure element 730, and a second MCF 740. FIG. 7A also shows that the pPOS device 700A includes an interface 745 to a remote MCF 790 (which is further interfaced with a certified EMV level 3 (L3) payment application), an interface 725 between the secure MCF 710 and the second MCF 740, an interface 755 between the secure MCF 710 and the reader 750, an interface 735 between the sensor switch 760 and the secure element 730, an interface 775 between the MCF 740 and the user interface function 770, and an interface 715 between the secure MCF 710 and the secure element 730. Again, all of the elements and interfaces shown in FIG. 7A can be matched with a corresponding element and interface shown in FIG. 6, and all matching elements and interfaces have very similar or nearly identical functions and properties.

FIG. 7A shows that pPOS device 700A can be interfaced with an EMV level 3 payment application via a remote MCF 790. In some embodiments, the pPOS device 700A can be configured to interface with the remote MCF 790 using one or more of the following: USB (Universal Serial Bus), audio jack, Bluetooth, WiFi (wireless local area network), NFC (near field communication), near field magnetic induction (NFMI) communication, and any computer network.

FIG. 7A shows that the reader 750 can be external to the pPOS device. In some embodiments, the pPOS device 700A can be configured to perform I/O (input/output) functions with the reader 750 using one or more of the following: USB (Universal Serial Bus), audio jack, Bluetooth, WiFi (wireless local area network), NFC (near field communication), near field magnetic induction (NFMI) communication, a remote MCF, and any computer network.

FIG. 7A shows that the user interface function 770 can be external to the pPOS device. In some embodiments, the pPOS device 700A can be configured to perform I/O (input/output) functions with the user interface function 770 using one or more of the following: USB (Universal Serial Bus), audio jack, Bluetooth, WiFi (wireless local area network), NFC (near field communication), near field magnetic induction (NFMI) communication, a remote MCF, and any computer network.

FIG. 7A shows that the sensor switch 760 can be external to the pPOS device. In some embodiments, the pPOS device 700A can be configured to perform I/O (input/output) functions with the sensor switch 760 using one or more of the following: USB (Universal Serial Bus), audio jack, Bluetooth, WiFi (wireless local area network), NFC (near field communication), near field magnetic induction (NFMI) communication, a remote MCF, and any computer network.

As an example to FIG. 7A, the pPOS device 700A can be connected to a computer through a USB connection. Then, in some embodiments, the sensor switch 760 can be a fingerprint reader of the computer. Further, in some embodiments, the user interface function 770 can be a display screen of the computer.

Additionally, like FIG. 6 (e.g., interface 635), FIG. 7A also shows a direct interface 735 between the sensor switch 760 and the secure element 730. In some embodiments, such a configuration to directly route the sensor switch 760 to the secure element 730 can be undesirable for security reasons. Therefore, in some embodiments, the sensor switch 760 can be routed to the secure element 730 via the MCF 740 and/or the secure MCF 710, so that interface 735 is removed.

Figure 7B:
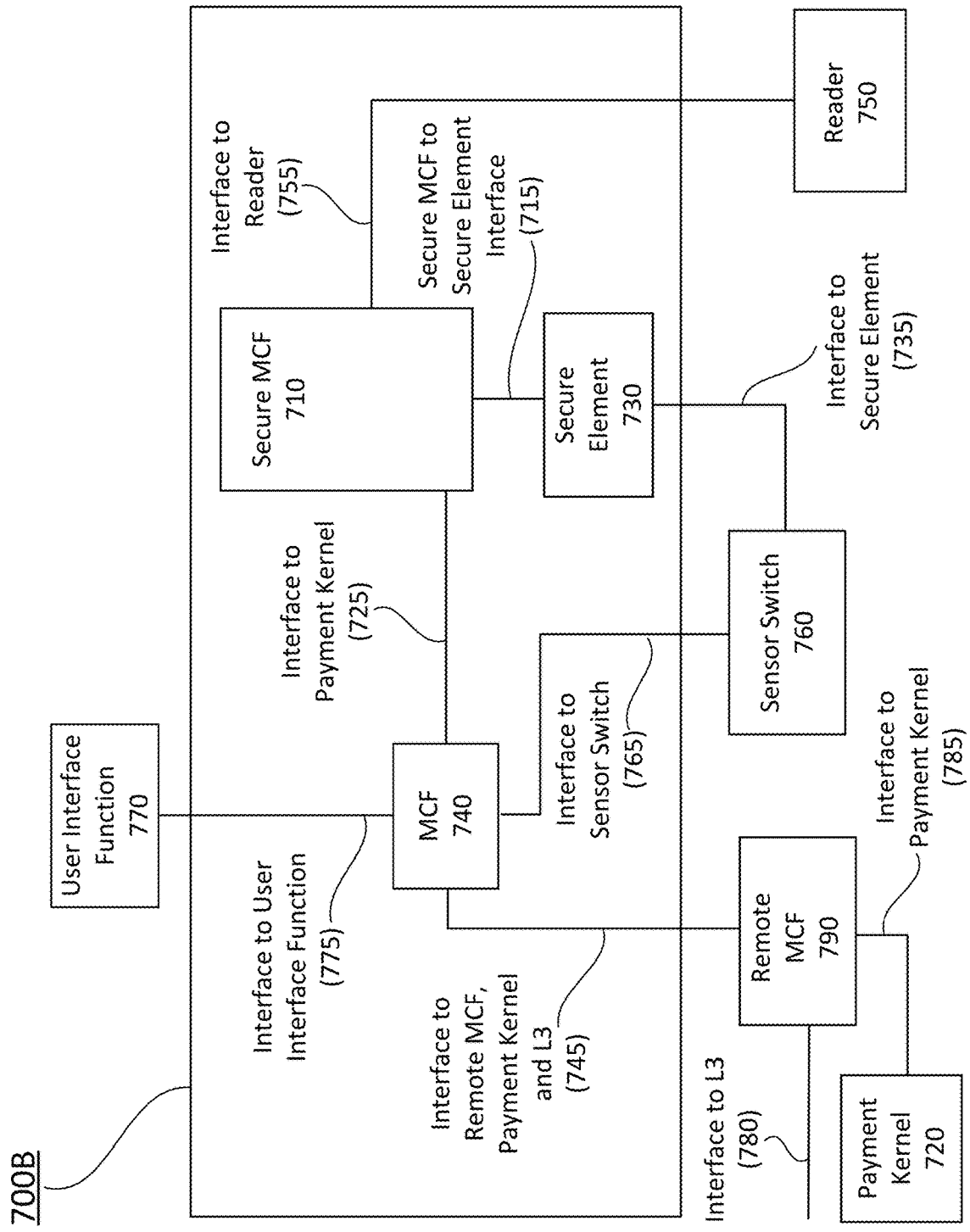
FIG. 7B shows an eighteenth personal Point of Sale (pPOS) device that is configured to provide for card present e-commerce transactions with a payment kernel remote to the device, in accordance with some example embodiments.

FIG. 7B shows an eighteenth personal Point of Sale (pPOS) device 700B that is configured to provide for card present e-commerce transactions with a payment kernel 720 remote to the device, in accordance with some example embodiments. The pPOS device 700B is very similar to the pPOS device 700A shown in FIG. 7A, except that the payment kernel 720 is remote to the device in the pPOS device 700B, while the payment kernel 720 is local to the device in the pPOS device 700A. Because payment kernel 720 is remote to pPOS device 700B, there is also an interface 785 connecting remote MCF 790 to remote payment kernel 720. Otherwise, all other components and interfaces function in a similar manner for both pPOS device 700A and pPOS device 700B.

Figure 7C:
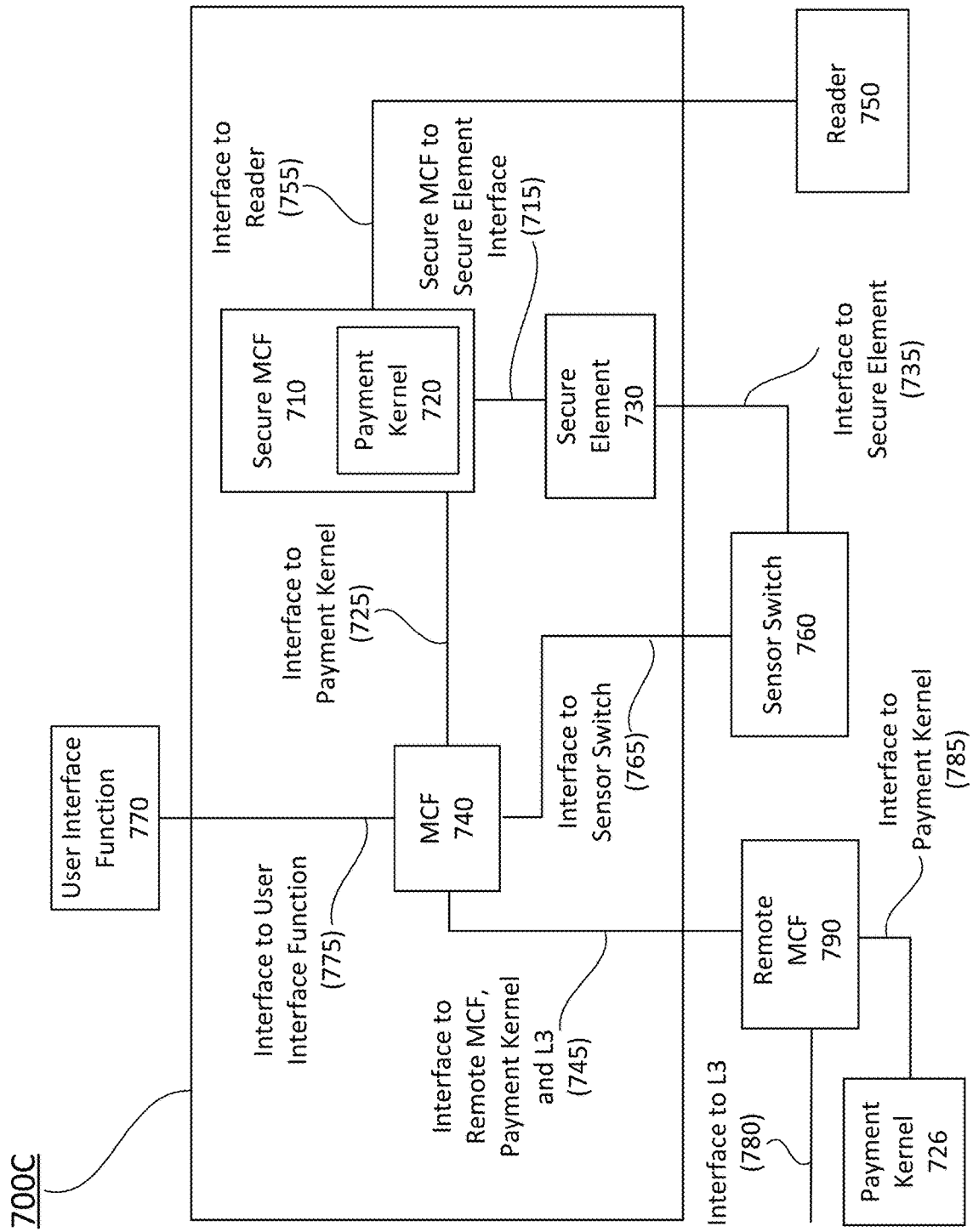
FIG. 7C shows a nineteenth personal Point of Sale (pPOS) device that is configured to provide for card present e-commerce transactions with a payment kernel split between being local and remote to the device, in accordance with some example embodiments.

FIG. 7C shows a nineteenth personal Point of Sale (pPOS) device 700C that is configured to provide for card present e-commerce transactions with a payment kernel split between being local and remote to the device, in accordance with some example embodiments. In pPOS device 700C, there is a payment kernel 720 that is local to the device 700C and a payment kernel 726 that is remote to the device 700C. The pPOS device 700C is very similar to the pPOS device 700A (shown in FIG. 7A) and the pPOS device 700B (shown in FIG. 7B), except that the payment kernel is now split between being local and remote to the pPOS device 700C, while the payment kernel is local to the device in the pPOS device 700A and remote to the device in the pPOS device 700B. Otherwise, all other components and interfaces function in a similar manner for all three devices: pPOS device 700A, pPOS device 700B, and pPOS device 700C.

Figure 8A:
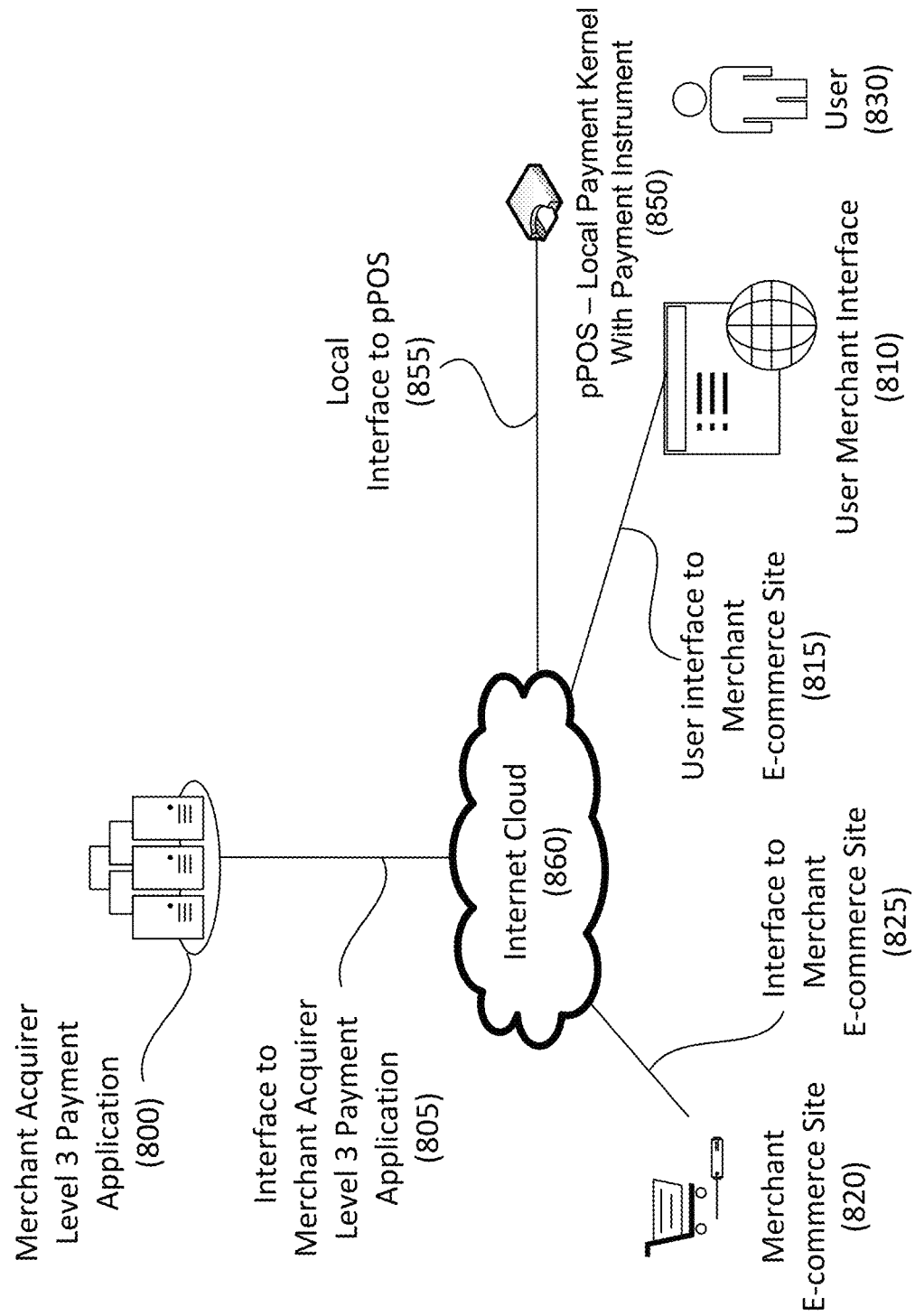
FIG. 8A shows a first configuration that can use a personal Point of Sale (pPOS) device with a local payment kernel for providing card present e-commerce transactions, in accordance with some example embodiments.

FIG. 8A shows a first configuration that can use a personal Point of Sale (pPOS) device with a local payment kernel for providing card present e-commerce transactions, in accordance with some example embodiments. In particular, FIG. 8A shows that the first configuration can include a pPOS (that includes a local payment kernel) with a payment instrument (jointly labeled as 850), a merchant e-commerce site 820, a user merchant interface 810, a merchant acquirer level 3 payment application 800, and the internet cloud 860 (which connects all these parts together). FIG. 8A also shows that these parts are all connected to the internet cloud 860 via their respective interfaces: local interface to pPOS (855) connects the pPOS (that includes a local payment kernel) with a payment instrument (jointly labeled as 850) to the internet cloud 860, interface to merchant e-commerce site (825) connects the merchant e-commerce site 820 to the internet cloud 860, user interface to merchant e-commerce site (815) connects the user merchant interface 810 to the internet cloud 860, interface to merchant acquirer level 3 payment application (805) connects the merchant acquirer level 3 payment application 800 to the internet cloud 860.

In some embodiments, the first configuration shown in FIG. 8A can work in the following manner. A user 830 interacts with a merchant e-commerce site 820 via a user merchant interface 810. Then the user 830 and/or the merchant can initiate a request for a payment transaction. Next the user 830 presents an instrument to a pPOS device (jointly labeled as 850), wherein no instrument data is entered into a website, a web page, or a mobile application. Here, in some embodiments, the instrument is a payment instrument (e.g.: a card form factor, or a mobile phone) and/or an identity instrument (e.g.: a face of the user, or a fingerprint of the user). Then the pPOS device authenticates and validates the instrument for the merchant and/or an issuer of the instrument. In FIG. 8A, in some embodiments, this authentication and validation can be performed in the payment kernel local to the pPOS device. The pPOS device also processes the payment transaction. The payment transaction processing is performed together with the merchant acquirer level 3 payment application 800.

In some embodiments, the payment instrument can be one of the following: a card form factor, a mobile phone, and a wearable. In some embodiments, the identity instrument enables authentication of a user and is comprised of one or more of the following: a face of the user, a finger of the user, a fingerprint of the user, an iris of the user, a voice of the user, a heart rhythm of the user, a physical attribute of the user.

Figure 8B:
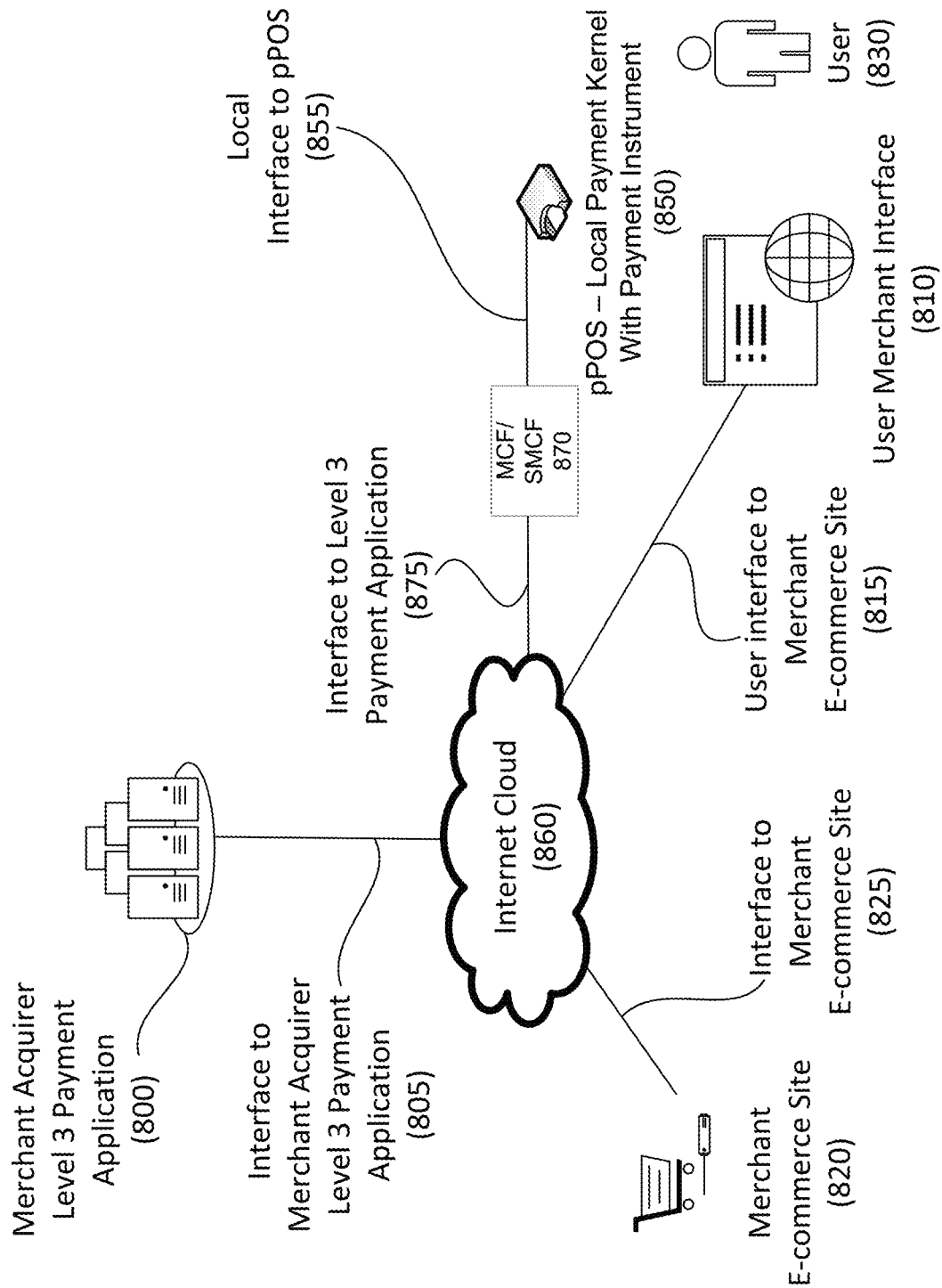
FIG. 8B shows a second configuration that can use a personal Point of Sale (pPOS) device with a local payment kernel for providing card present e-commerce transactions, in accordance with some example embodiments.

FIG. 8B shows a second configuration that can use a personal Point of Sale (pPOS) device with a local payment kernel for providing card present e-commerce transactions, in accordance with some example embodiments. The second configuration shown in FIG. 8B is very similar to the first configuration shown in FIG. 8A, except that the second configuration shown in FIG. 8B also includes another MCF/SMCF 870 (microcontroller function/secure microcontroller function 870) to connect the pPOS device to the internet cloud 860. In some embodiments, the second configuration shown in FIG. 8B can be using the pPOS device shown in FIG. 7A. This is because FIG. 7A show a pPOS device 700A with a payment kernel local to the device, that is interfaced with an EMV level 3 payment application via a remote MCF 790. In this regards, remote MCF 790 of FIG. 7A would be corresponding to MCF/SMCF 870 of FIG. 8B. Using a remote MCF/SMCF to connect a pPOS device to an EMV level 3 payment application can, in some embodiments, have advantages of higher performance and higher security.

In both FIGS. 8A and 8B, the payment kernel is local to the pPOS device, so that all payment kernel processing can be performed locally on the pPOS device. In other embodiments, the payment kernel can be remote to the pPOS device, so that all payment kernel processing can be performed remotely from the pPOS device. These are the embodiments shown in FIGS. 8C and 8D. In still other embodiments, the payment kernel can be split between being local and remote to the pPOS device, so all payment kernel processing can be performed split between local processing and remote processing. These are the embodiments shown in FIGS. 8E and 8F.

Figure 8C:
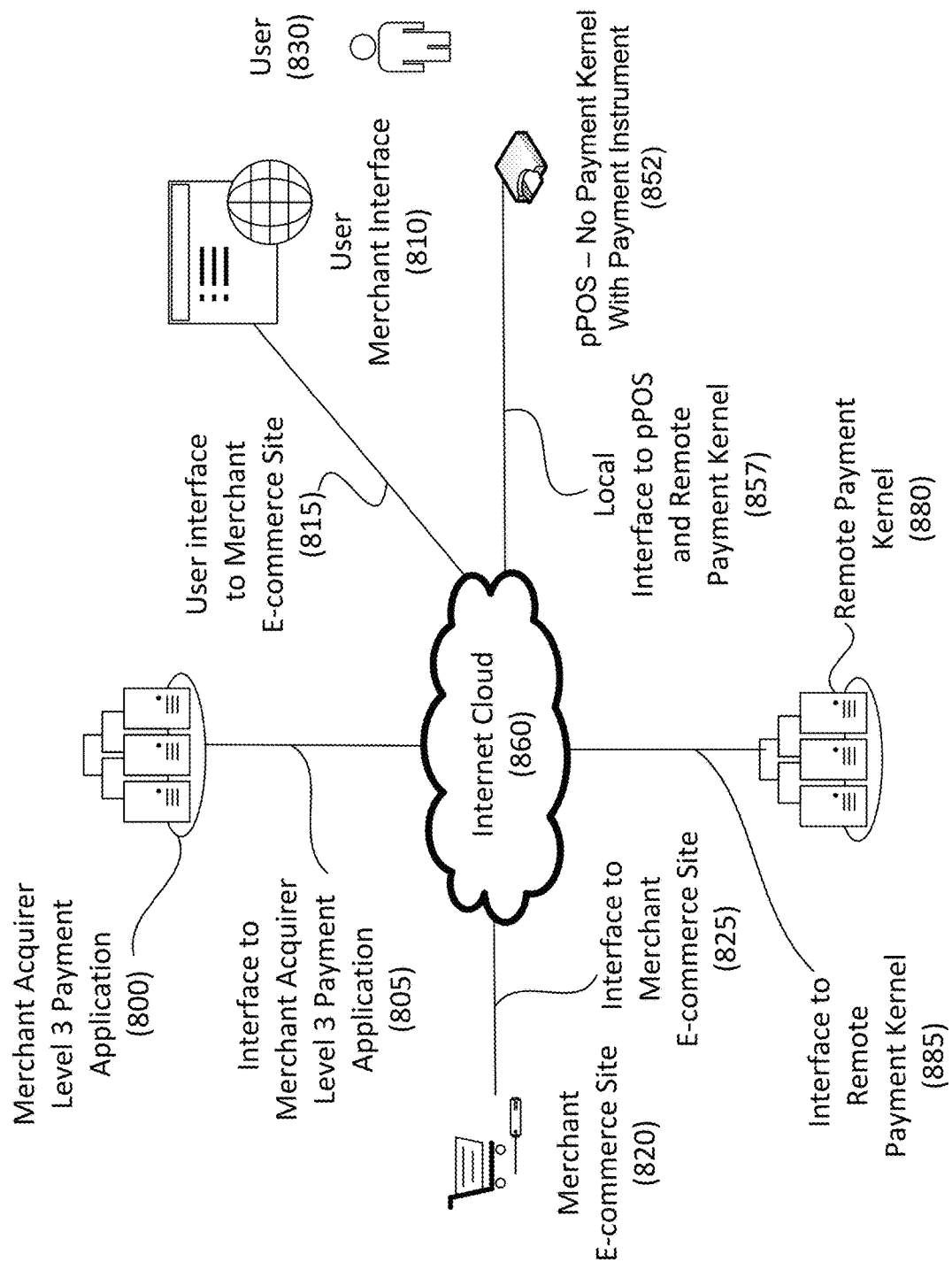
FIG. 8C shows a third configuration that can use a personal Point of Sale (pPOS) device with a remote payment kernel for providing card present e-commerce transactions, in accordance with some example embodiments.

FIG. 8C shows a third configuration that can use a personal Point of Sale (pPOS) device with a remote payment kernel for providing card present e-commerce transactions, in accordance with some example embodiments. In particular, FIG. 8C shows that the first configuration can include a pPOS (that does not include a local payment kernel) with a payment instrument (jointly labeled as 852), a remote payment kernel 880, a merchant e-commerce site 820, a user merchant interface 810, a merchant acquirer level 3 payment application 800, and the internet cloud 860 (which connects all these parts together). FIG. 8C also shows that these parts are all connected to the internet cloud 860 via their respective interfaces: local interface to pPOS (857) connects the pPOS (that does not include a local payment kernel) with a payment instrument (jointly labeled as 852) to the internet cloud 860, interface to remote payment kernel (885) connects the remote payment kernel 880 to the internet cloud 860, interface to merchant e-commerce site (825) connects the merchant e-commerce site 820 to the internet cloud 860, user interface to merchant e-commerce site (815) connects the user merchant interface 810 to the internet cloud 860, interface to merchant acquirer level 3 payment application (805) connects the merchant acquirer level 3 payment application 800 to the internet cloud 860.

In some embodiments, the third configuration shown in FIG. 8C can work in the following manner. A user 830 interacts with a merchant e-commerce site 820 via a user merchant interface 810. Then the user 830 and/or the merchant can initiate a request for a payment transaction. Next the user 830 presents an instrument to a pPOS device (jointly labeled as 852), wherein no instrument data is entered into a website, a web page, or a mobile application. Here, in some embodiments, the instrument is a payment instrument (e.g.: a card form factor, or a mobile phone) and/or an identity instrument (e.g.: a face of the user, or a fingerprint of the user). Then the pPOS device authenticates and validates the instrument for the merchant and/or an issuer of the instrument. In FIG. 8C, in some embodiments, this authentication and validation can be performed in the payment kernel 880, which is remote to the pPOS device. The pPOS device also processes the payment transaction. The payment transaction processing is performed together with the remote payment kernel 880 and the merchant acquirer level 3 payment application 800.

In some embodiments, the payment instrument can be one of the following: a card form factor, a mobile phone, and a wearable. In some embodiments, the identity instrument enables authentication of a user and is comprised of one or more of the following: a face of the user, a finger of the user, a fingerprint of the user, an iris of the user, a voice of the user, a heart rhythm of the user, a physical attribute of the user.

Figure 8D:
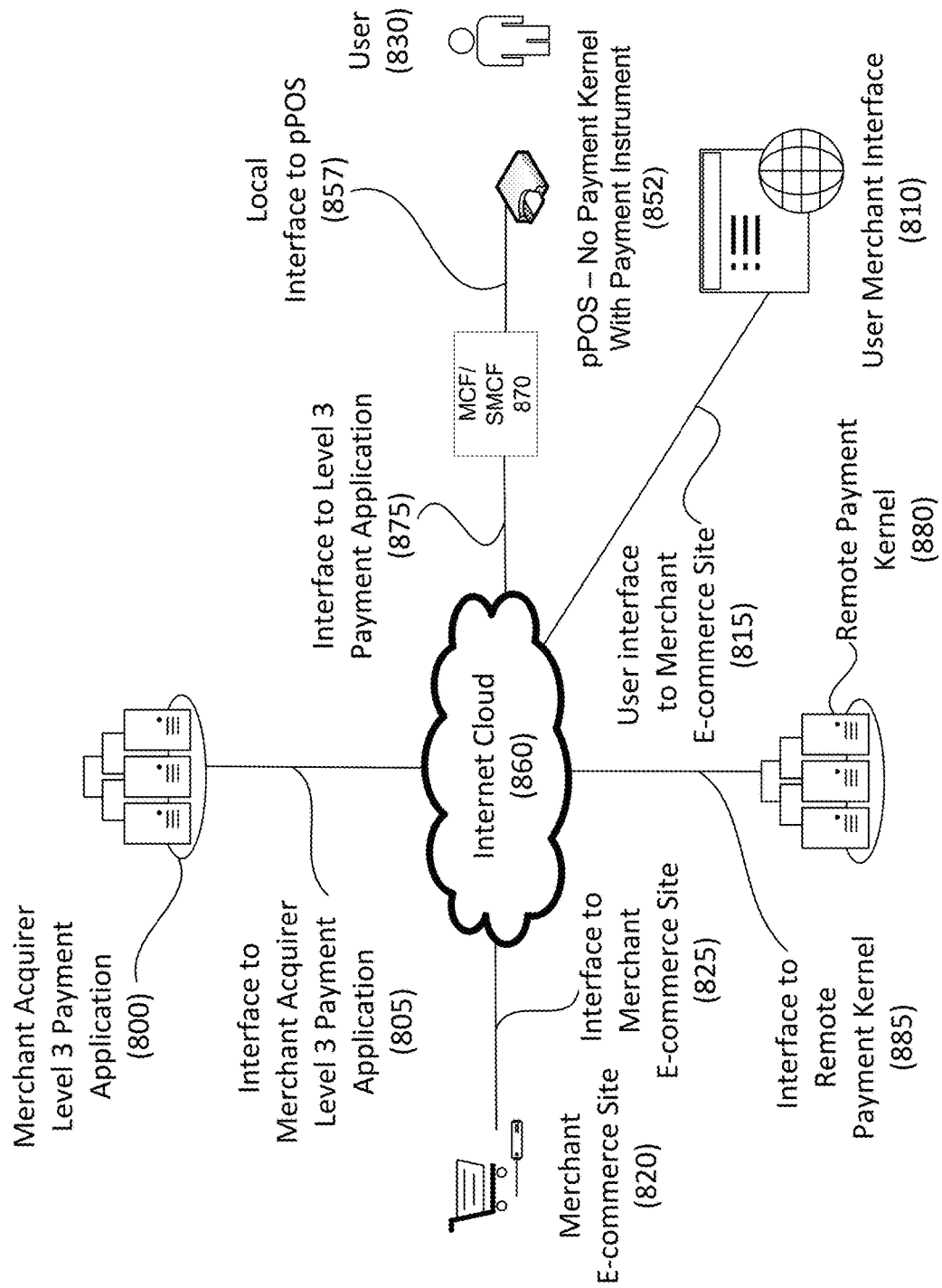
FIG. 8D shows a fourth configuration that can use a personal Point of Sale (pPOS) device with a remote payment kernel for providing card present e-commerce transactions, in accordance with some example embodiments.

FIG. 8D shows a fourth configuration that can use a personal Point of Sale (pPOS) device with a remote payment kernel for providing card present e-commerce transactions, in accordance with some example embodiments. The fourth configuration shown in FIG. 8D is very similar to the third configuration shown in FIG. 8C, except that the fourth configuration shown in FIG. 8D also includes another MCF/SMCF 870 (microcontroller function/secure microcontroller function 870) to connect the pPOS device to the internet cloud 860. In some embodiments, the fourth configuration shown in FIG. 8D can be using the pPOS device shown in FIGS. 4B and 7B. This is because FIG. 4B/7B show a pPOS device 400B/700B with a payment kernel remote to the device, that is interfaced with an EMV level 3 payment application via a remote MCF 490/790. In this regards, remote MCF 490/790 of FIG. 4B/7B would be corresponding to MCF/SMCF 870 of FIG. 8D. Using a remote MCF/SMCF to connect a pPOS device to an EMV level 3 payment application can, in some embodiments, have advantages of higher performance and higher security.

Figure 8E:
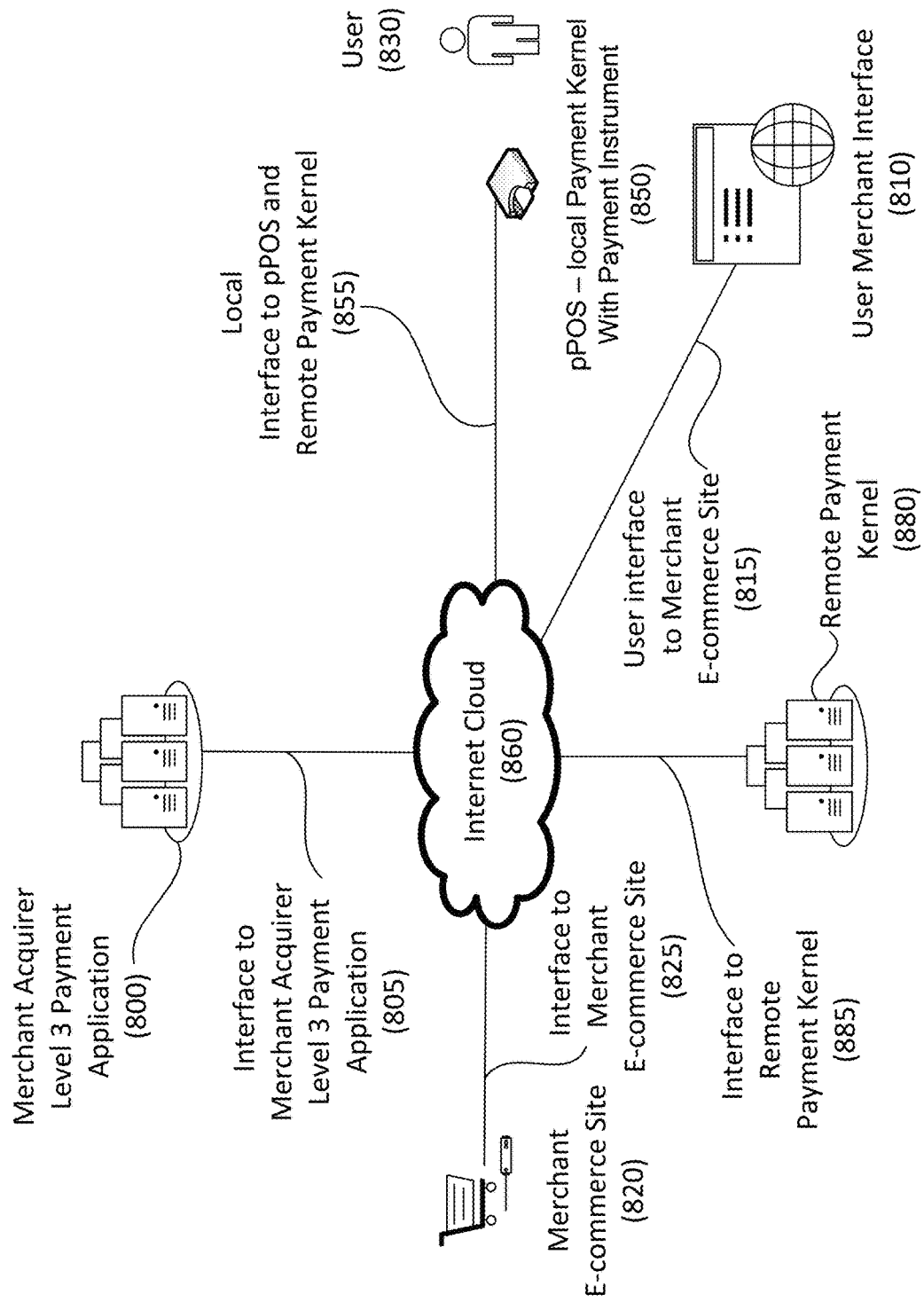
FIG. 8E shows a fifth configuration that can use a personal Point of Sale (pPOS) device with a split payment kernel for providing card present e-commerce transactions, in accordance with some example embodiments.

FIG. 8E shows a fifth configuration that can use a personal Point of Sale (pPOS) device with a split payment kernel for providing card present e-commerce transactions, in accordance with some example embodiments. In particular, FIG. 8E shows that the fifth configuration can include a pPOS (that includes a local payment kernel) with a payment instrument (jointly labeled as 850), a remote payment kernel 880, a merchant e-commerce site 820, a user merchant interface 810, a merchant acquirer level 3 payment application 800, and the internet cloud 860 (which connects all these parts together). FIG. 8E also shows that these parts are all connected to the internet cloud 860 via their respective interfaces: local interface to pPOS (855) connects the pPOS (that includes a local payment kernel) with a payment instrument (jointly labeled as 850) to the internet cloud 860, interface to remote payment kernel (885) connects the remote payment kernel 880 to the internet cloud 860, interface to merchant e-commerce site (825) connects the merchant e-commerce site 820 to the internet cloud 860, user interface to merchant e-commerce site (815) connects the user merchant interface 810 to the internet cloud 860, interface to merchant acquirer level 3 payment application (805) connects the merchant acquirer level 3 payment application 800 to the internet cloud 860.

In some embodiments, the fifth configuration shown in FIG. 8E can work in the following manner. A user 830 interacts with a merchant e-commerce site 820 via a user merchant interface 810. Then the user 830 and/or the merchant can initiate a request for a payment transaction. Next the user 830 presents an instrument to a pPOS device (jointly labeled as 850), wherein no instrument data is entered into a website, a web page, or a mobile application. Here, in some embodiments, the instrument is a payment instrument (e.g.: a card form factor, or a mobile phone) and/or an identity instrument (e.g.: a face of the user, or a fingerprint of the user). Then the pPOS device authenticates and validates the instrument for the merchant and/or an issuer of the instrument. In FIG. 8E, in some embodiments, this authentication and validation can be performed split between the payment kernel local to the pPOS device and the payment kernel 880 remote to the pPOS device. The pPOS device also processes the payment transaction. The payment transaction processing is performed together with the local payment kernel on the pPOS device, the remote payment kernel 880, and the merchant acquirer level 3 payment application 800.

In some embodiments, the payment instrument can be one of the following: a card form factor, a mobile phone, and a wearable. In some embodiments, the identity instrument enables authentication of a user and is comprised of one or more of the following: a face of the user, a finger of the user, a fingerprint of the user, an iris of the user, a voice of the user, a heart rhythm of the user, a physical attribute of the user.

Figure 8F:
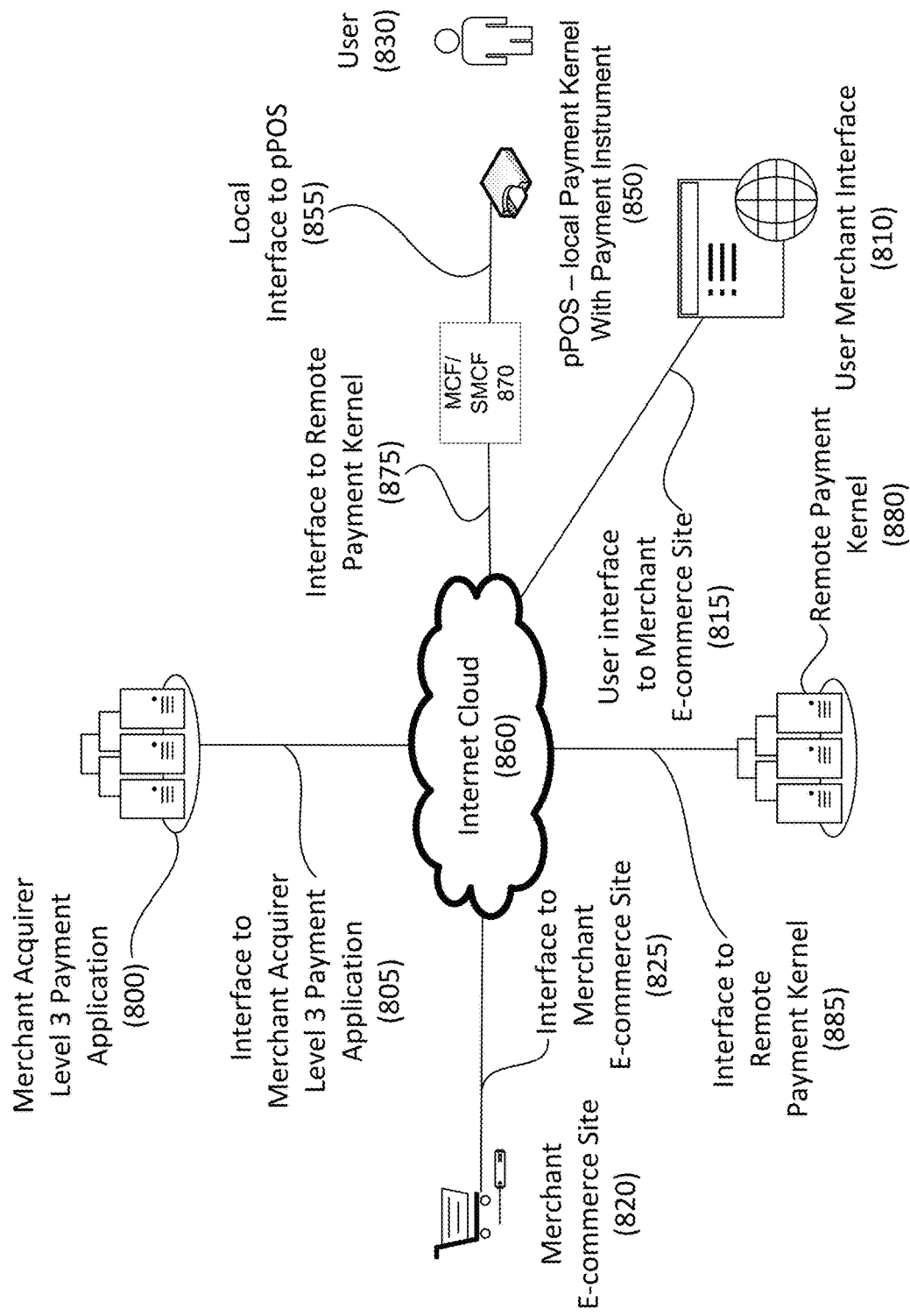
FIG. 8F shows a sixth configuration that can use a personal Point of Sale (pPOS) device with a split payment kernel for providing card present e-commerce transactions, in accordance with some example embodiments.

FIG. 8F shows a sixth configuration that can use a personal Point of Sale (pPOS) device with a split payment kernel for providing card present e-commerce transactions, in accordance with some example embodiments. The sixth configuration shown in FIG. 8F is very similar to the fifth configuration shown in FIG. 8E, except that the sixth configuration shown in FIG. 8F also includes another MCF/SMCF 870 (microcontroller function/secure microcontroller function 870) to connect the pPOS device to the internet cloud 860. In some embodiments, the sixth configuration shown in FIG. 8F can be using the pPOS device shown in FIGS. 5 and 7C. This is because FIG. 5/7C shows a pPOS device 500/700C with a split payment kernel (that is both local and remote to the device), that is interfaced with an EMV level 3 payment application via a remote MCF 590/790. In this regards, remote MCF 590/790 of FIG. 5/7C would be corresponding to MCF/SMCF 870 of FIG. 8F. Using a remote MCF/SMCF to connect a pPOS device to an EMV level 3 payment application can, in some embodiments, have advantages of higher performance and higher security.

Figure 9:
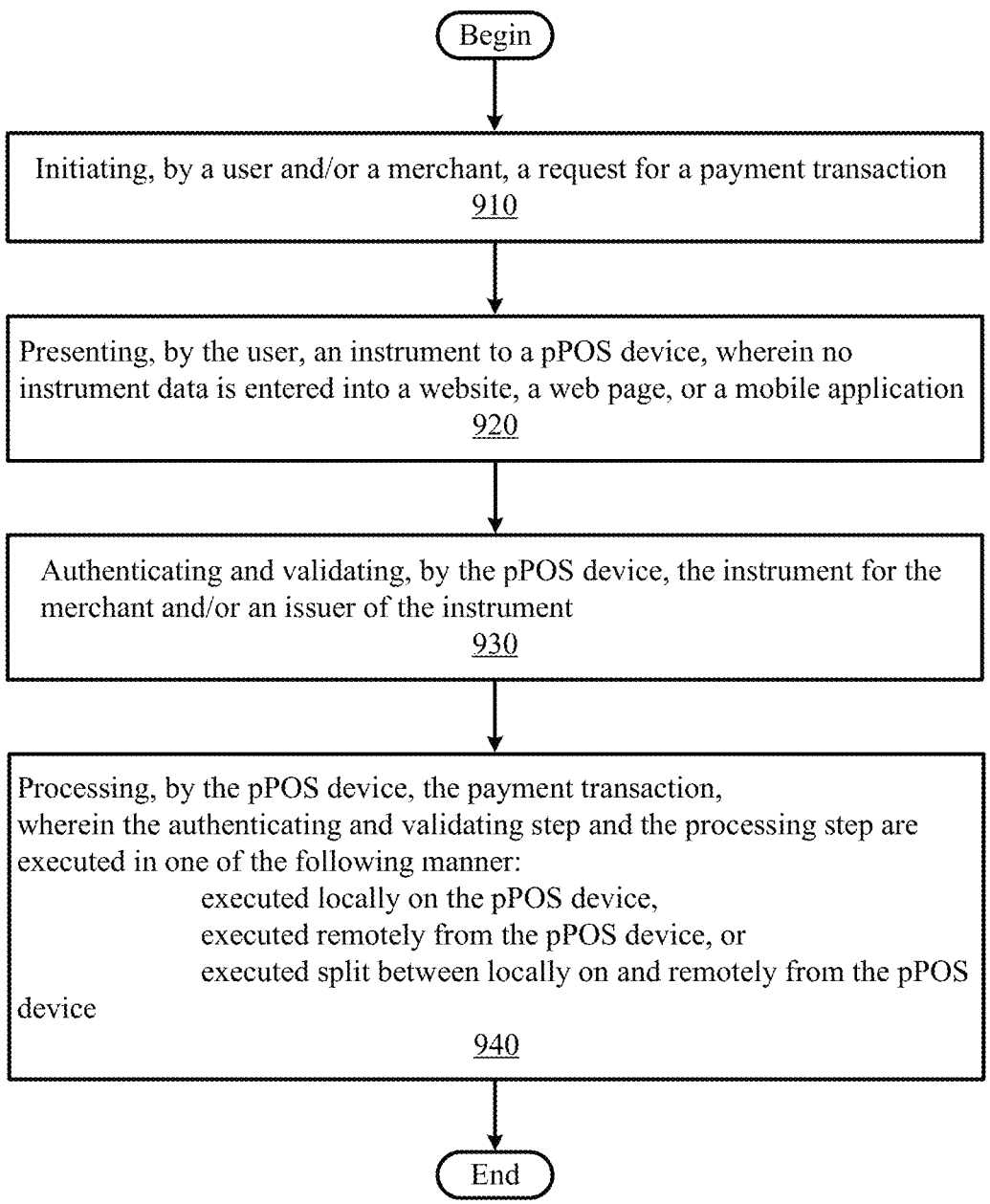
FIG. 9 shows a flow chart of method steps for providing a personal Point of Sale (pPOS) for card present e-commerce transactions wherein a payment processing can be executed either (a) locally on, (b) remotely from, or (3) split between locally on and remotely from a pPOS device, in accordance with some example embodiments.

FIG. 9 shows a flow chart of method steps for providing a personal Point of Sale (pPOS) for card present e-commerce transactions, in accordance with some example embodiments. As shown in FIG. 9, the method 900 begins at step 910, where the method initiates, by a user and/or a merchant, a request for a payment transaction. Then, the method proceeds to step 920. In step 920, the method presents, by the user, an instrument to a pPOS device, wherein no instrument data is entered into a website, a web page, or a mobile application. Next, at step 930, the method authenticates and validates, by the pPOS device, the instrument for the merchant and/or an issuer of the instrument. Then, at step 940, the method processes, by the pPOS device, the payment transaction, wherein the authenticating and validating step and the processing step are executed in one of the following manner:

(1) executed locally on the pPOS device,
(2) executed remotely from the pPOS device, or
(3) executed split between locally on and remotely from the pPOS device.

In some embodiments, the instrument is a payment instrument and/or an identity instrument.

A pPOS device can provide for card present e-commerce transactions. In some embodiments, for a pPOS device, a customer initiates the transaction by presenting the payment and/or identity instrument to the pPOS device. In some embodiments, for a pPOS device, a merchant initiates the transaction from an external system that requires a payment and/or authentication from a user. In some embodiments, the identity instrument enables authentication of a user and is comprised of one or more of the following: a face of the user, a finger of the user, a fingerprint of the user, an iris of the user, a voice of the user, a heart rhythm of the user, a physical attribute of the user.

In some embodiments, the payment instrument can be one of the following: a card form factor, a mobile phone, and a wearable. In some embodiments, the identity instrument is comprised of one or more of the following: a face of the user, a finger of the user, a fingerprint of the user, an iris of the user, a voice of the user, a heart rhythm of the user, a physical attribute of the user.

In some embodiments, the authenticating and validating step and the processing step are executed locally on and/or remotely from the pPOS device based on merchant and merchant acquirer rules. In some embodiments, an execution time is managed for optimal performance based on local and remote processing resources.

In some embodiments, a processing logic for execution locally on and/or remotely from the pPOS device is determined based on one or more of the following: merchant type, items or services being purchased, payment application, payment presentment type, processing time, merchant preference, merchant acquirer processing rules. In some embodiments, a shared processing between executing locally on and/or remotely from the pPOS device is optimized for performance of the payment transaction based on one or more of the following: merchant type, items or services being purchased, payment and/or identification instrument, payment and/or identification application, payment presentment type, processing time, merchant preference, merchant acquirer processing rules, remote resources, local resources, interface protocol and capabilities.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A device for providing a personal point of sale (pPOS) for card present e-commerce transactions, the device comprising:
   a secure microcontroller function (MCF);
   a secure element communicatively coupled to the secure MCF and configured to store and process payment and identification application; and
   a first interface between a reader and the secure MCF, a second interface between the secure element and a sensor switch, and a third interface between the secure MCF and a second MCF to communicatively couple the secure MCF to a remote payment kernel through the second MCF and a separate interface between the second MCF and the remote payment kernel, and therein provide access to the remote payment kernel.

2. The device of claim 1 further comprising one or more of the following:
   the reader, the reader configured to read a payment and/or identity instrument; and
   the sensor switch, the sensor switch configured to initiate and/or terminate a user interface function.

3. The device of claim 1, wherein a user of the device is allowed to grant access to configuration and processing of the remote payment kernel by a merchant, a merchant acquirer, a payment issuer, and/or an identification issuer.

4. The device of claim 1, further including the second MCF, wherein at least one of the secure MCF and the second MCF is to perform I/O (input/output) functions.

5. The device of claim 4,
   wherein at least one of the secure MCF and the second MCF is configured to perform I/O (input/output) functions with a certified EMV level 3 (L3) payment application, wherein EMV stands for Europay, MasterCard, and Visa,
   wherein the secure MCF and/or the second MCF is further configured to perform I/O (input/output) functions with one or more of the following:
   the reader, the reader configured to read a payment and/or identity instrument, and
   the sensor switch, the sensor switch configured to initiate and/or terminate a transaction.

6. The device of claim 5, wherein the secure MCF and/or the second MCF is configured to perform I/O (input/output) functions with the certified EMV level 3 (L3) payment application using one or more of the following:

USB (Universal Serial Bus),
audio jack,
Bluetooth,
WiFi (wireless local area network),
NFC (near field communication),
near field magnetic induction (NFMI) communication,
a remote MCF,
any computer network.

7. An apparatus comprising:
a device for providing a personal point of sale (pPOS) for card present e-commerce transactions, the device including:
   a secure microcontroller function (MCF) as part of a computer and configured to access payment information from a reader; and
   a secure element to store and execute a payment application and identification application to authenticate at least one of a payment instrument and a user of the device for a transaction; and
a payment kernel configured to interface with the secure MCF, through a second MCF that communicatively couples the secure MCF with the payment kernel, and to process payment for the transaction in response to the authentication, the payment kernel being local, remote, or split between local and remote to the device; and
wherein the apparatus includes a first interface between the reader and the secure MCF, a second interface between the secure element and a sensor switch, and a third interface between the secure MCF and second MCF to provide access to the payment kernel, the third interface being separate from an interface between the second MCF and the payment kernel.

8. The apparatus of claim 7, wherein the payment kernel is configured to support both local and remote execution of payment processing based on merchant and merchant acquirer rules, wherein the secure MCF is configured to perform input/output functions with a merchant payment application for the transaction.

9. The apparatus of claim 7, further comprising one or more of the following:
   the reader, the reader configured to read a payment and/or identity instrument; and
   the sensor switch, the sensor switch configured to initiate and/or terminate a transaction.

10. The apparatus of claim 7, further including the second MCF, wherein the secure MCF and/or the second MCF is to perform I/O (input/output) functions.

11. The apparatus of claim 10,
wherein the secure MCF is configured and arranged with the second MCF to perform the I/O (input/output) functions with a certified EMV level 3 (L3) payment application, wherein EMV stands for Europay, MasterCard, and Visa,
wherein the secure MCF and/or the second MCF is further to perform I/O (input/output) functions with one or more of the following:
the reader, the reader configured to read a payment and/or identity instrument, and
the sensor switch, the sensor switch configured to initiate and/or terminate a transaction.

12. The apparatus of claim 10,
wherein the secure MCF is configured and arranged with the second MCF to perform the I/O (input/output) functions with a certified EMV level 3 (L3) payment application via the second MCF which is remote relative to the device,
wherein EMV stands for Europay, MasterCard, and Visa.

13. The apparatus of claim 12, wherein the payment kernel is interfaced to the device via the second MCF.

14. The apparatus of claim 7, wherein the payment kernel is configured by a merchant and/or merchant acquirer for a merchant payment and/or a user authentication transaction.

15. The apparatus of claim 7, wherein the secure element is configured to execute:
   a secure element application either local to and/or remote to the device, wherein the secure element application is used for payment and/or authentication.

16. The apparatus of claim 9, wherein the sensor switch is further configured to collect user authentication data and notify a user of a device status.

17. The apparatus of claim 10, wherein the secure MCF and/or the second MCF is configured to perform I/O (input/output) functions with a certified EMV level 3 (L3) payment application, wherein EMV stands for Europay, MasterCard, and Visa.

18. The apparatus of claim 17, wherein the I/O (input/output) functions provide transaction level routing between the payment kernel that is local to the device and the payment kernel that is remote to the device.

19. The apparatus of claim 18, wherein a routing logic is determined based on one or more of the following:
   payment and/or identification instrument,
   payment and/or identification application,
   payment and/or identification application data elements,
   payment and/or identification transaction history,
   merchant type,
   merchant payment processing rules,
   merchant device identification rules,
   merchant device user authentication rules, and
   merchant acquirer data element and processing results.

20. The apparatus of claim 7, wherein the device is configured to accept a payment and/or identity instrument and the user initiates the transaction by presenting a payment and/or identity instrument to the device.

21. The apparatus claim 20, wherein the identity instrument is configured to authentication of a user and is comprised of one or more of the following:
   a face of the user,
   a finger of the user,
   a fingerprint of the user,
   an iris of the user,
   a voice of the user,
   a heart rhythm of the user, and
   a physical attribute of the user.

22. The apparatus of claim 7, wherein the secure MCF is configured to initiate the transaction in response to data from a merchant payment application, the data being indicative of a merchant and/or customer initiating the transaction from an external system that requires a payment and/or authentication from a user.

23. A device for providing a personal point of sale (pPOS) for card present e-commerce transactions, the device comprising:
   a secure microcontroller function (MCF) communicatively coupled with a payment kernel remote to the device via a second MCF;
   a secure element to store and process payment and identification application; and
   a first interface between a reader and the secure MCF, a second interface between the secure element and a sensor switch, and a third interface between the secure MCF and the second MCF that is to provide access to the payment kernel by the secure MCF through the second MCF and a separate interface between the second MCF and the payment kernel.

24. The device of claim 1 further comprising one or more of the following:
   the reader, the reader configured to read a payment and/or identity instrument; and
   the sensor switch, the sensor switch configured to initiate and/or terminate a user interface function.

25. The device of claim 1, further including the second MCF, wherein at least one of the secure MCF and the second MCF is to perform I/O (input/output) functions.

* * * * *